US011010896B2

(12) United States Patent
Kamiyama et al.

(10) Patent No.: US 11,010,896 B2
(45) Date of Patent: May 18, 2021

(54) METHODS AND SYSTEMS FOR GENERATING 3D DATASETS TO TRAIN DEEP LEARNING NETWORKS FOR MEASUREMENTS ESTIMATION

(71) Applicant: Bodygram, Inc., Las Vegas, NV (US)

(72) Inventors: Kyohei Kamiyama, Tokyo (JP); Chong Jin Koh, Las Vegas, NV (US)

(73) Assignee: Bodygram, Inc., Las Vegas, NV (US)

( * ) Notice: Subject to any disclaimer, the term of this patent is extended or adjusted under 35 U.S.C. 154(b) by 0 days.

(21) Appl. No.: 16/697,146

(22) Filed: Nov. 26, 2019

(65) Prior Publication Data
US 2020/0193591 A1 Jun. 18, 2020

Related U.S. Application Data

(63) Continuation-in-part of application No. 16/517,391, filed on Jul. 19, 2019, now Pat. No. 10,489,683.
(Continued)

(51) Int. Cl.
| | |
|---|---|
| G06K 9/00 | (2006.01) |
| G06T 7/00 | (2017.01) |
| G06N 3/08 | (2006.01) |
| G06T 7/73 | (2017.01) |
| G06T 7/33 | (2017.01) |

(52) U.S. Cl.
CPC ............ *G06T 7/0012* (2013.01); *G06N 3/08* (2013.01); *G06T 7/344* (2017.01); *G06T 7/75* (2017.01);
(Continued)

(58) Field of Classification Search
CPC ............ G06N 3/08; G06T 2207/20084; G06T 2207/20081; G06F 30/27
See application file for complete search history.

(56) References Cited

U.S. PATENT DOCUMENTS

| | | |
|---|---|---|
| 5,956,525 A | 9/1999 | Minsky |
| 6,490,534 B1 | 12/2002 | Pfister |
(Continued)

FOREIGN PATENT DOCUMENTS

| | | |
|---|---|---|
| WO | WO2011142655 A2 | 11/2011 |
| WO | WO2014076633 A1 | 5/2014 |

OTHER PUBLICATIONS

The Hong Kong Polytechnic University, "PolyU intelligent 3D human modelling technology projecting body shape and size accurately within 10 seconds", Apr. 10, 2018, Available at: https://www.polyu.edu.hk/web/en/media/media_releases/index_id_6527.html.
(Continued)

*Primary Examiner* — Solomon G Bezuayehu
(74) *Attorney, Agent, or Firm* — American Patent Agency PC; Daniar Hussain; Xiaomeng Shi

(57) ABSTRACT

Disclosed are systems and methods for generating data sets for training deep learning networks for key point annotations and measurements extraction from photos taken using a mobile device camera. The method includes the steps of receiving a 3D scan model of a 3D object or subject captured from a 3D scanner and a 2D photograph of the same 3D object or subject at a virtual workspace. The 3D scan model is rigged with one or more key points. A superimposed image of a pose-adjusted and aligned 3D scan model superimposed over the 2D photograph is captured by a virtual camera in the virtual workspace. Training data for a key point annotation DLN is generated by repeating the steps for a plurality of objects belonging to a plurality of object categories. The key point annotation DLN learns from the training data to produce key point annotations of objects from 2D photographs captured using any mobile device camera.

20 Claims, 27 Drawing Sheets

Related U.S. Application Data

(60) Provisional application No. 62/929,048, filed on Oct. 31, 2019, provisional application No. 62/780,737, filed on Dec. 17, 2018.

(52) U.S. Cl.
CPC .............. *G06T 2207/20081* (2013.01); *G06T 2207/20084* (2013.01)

(56) References Cited

U.S. PATENT DOCUMENTS

| | | | |
|---|---|---|---|
| 8,908,928 | B1 | 12/2014 | Hansen |
| 9,189,886 | B2 | 11/2015 | Black et al. |
| 9,251,591 | B2 | 2/2016 | Song et al. |
| 9,292,967 | B2 | 3/2016 | Black et al. |
| 9,489,744 | B2 | 11/2016 | Black et al. |
| 9,623,578 | B1 | 4/2017 | Aminpour et al. |
| 9,727,787 | B2 | 8/2017 | Wilf et al. |
| 9,858,719 | B2 | 1/2018 | Dorner et al. |
| 10,157,416 | B2 | 12/2018 | Adeyoola et al. |
| 10,210,631 | B1* | 2/2019 | Cinnamon ............ G06T 11/003 |
| 10,417,781 | B1* | 9/2019 | Konolige ................ G06T 7/60 |
| 2010/0182400 | A1* | 7/2010 | Nelson ...................... G06T 7/80 348/42 |
| 2014/0270540 | A1 | 9/2014 | Spector et al. |
| 2014/0277663 | A1 | 9/2014 | Gupta et al. |
| 2017/0061625 | A1* | 3/2017 | Estrada ................ G06N 3/0454 |
| 2017/0273639 | A1 | 9/2017 | Iscoe et al. |
| 2017/0364733 | A1* | 12/2017 | Estrada ................ G06N 3/0454 |
| 2018/0101932 | A1* | 4/2018 | Kwon .................. G06T 3/0068 |
| 2018/0150360 | A1* | 5/2018 | Derda .................... A61B 90/36 |
| 2018/0158230 | A1* | 6/2018 | Yan ........................ G06T 11/00 |
| 2019/0005737 | A1* | 1/2019 | Auvray .................. G16H 15/00 |
| 2019/0019347 | A1* | 1/2019 | Auvray ................ G06T 7/0012 |
| 2019/0122424 | A1 | 4/2019 | Moore et al. |
| 2019/0180082 | A1* | 6/2019 | Moravec .................. G06T 7/70 |
| 2019/0295250 | A1* | 9/2019 | Zhang ...................... G06T 7/33 |
| 2020/0054234 | A1* | 2/2020 | Vaara ..................... A61B 34/10 |
| 2020/0082614 | A1* | 3/2020 | Xu ....................... G01S 17/931 |

OTHER PUBLICATIONS

Yihu, available at: https://www.youtube.com/watch?v=vnCMfTOHvek.
Mtailor, "Custom Clothes, Guaranteed Fit", available at: https://www.mtailor.com/.
Body Labs, available at: https://en.wikipedia.org/wiki/Body_Labs.
Krinninger, Thomas, 2016. "One-Shot 3D Body-Measurement," Master's thesis, Graz University of Technology, Graz, Austria. Available at https://www.reactivereality.com/static/pdf/krinninger_master_thesis.pdf.
Liang-Chieh Chen, et al., "DeepLab: Semantic Image Segmentation with Deep Convolutional Nets, Atrous Convolution, and Fully Connected CRFs," IEEE, May 12, 2017, Available at: https://ieeexplore.ieee.org/abstract/document/7913730.
Dan Song, et al., "Clothes Size Prediction from Dressed-human Silhouettes," Jun. 2017, Available at: https://www.researchgate.net/publication/320733122_Clothes_Size_Prediction_from_Dressed-Human_Silhouettes.
Sizer, "Size is never an issue," available at: https://sizer.me/.
Shunhua Luo, "Application Research on 2D Image-based Non-contact Anthropometric Technology in Clothing E-commerce," In: Advances in Engineering Research, vol. 122, 7th International Conference on Applied Science, Engineering and Technology (ICASET 2017).
Shuaiyin Zhu, et al., "An efficient human model customization method based on orthogonal-view monocular photos," Computer-Aided Design 45, pp. 1314-1332, 2013.
AppAdvice LLC, "1Measure by Shenzhen TOZI Tech Co., Ltd.", Available at https://appadvice.com/app/1measure/1234853015, last accessed Aug. 10, 2019.
The Hong Kong Polytechnic University, "Intelligent 3-D human modelling technology projects body shape and size accurately within 10 seconds", Apr. 11, 2018, Available at: https://phys.org/news/2018-04-d-human-technology-body-size.html.
Emily Petsko, "This 3D Human Modeling App Could Revolutionize Online Clothes Shopping", Apr. 12, 2018, Available at: http://mentalfloss.com/article/539924/3d-human-modeling-app-could-revolutionize-online-clothes-shopping.
The Long Nguyen, et al., "Studies of Anthropometrical Features using Machine Learning Approach," Conference Paper, Apr. 2015, AIST 2015—Analysis of Images, Social Networks and Texts, Yekaterinburg, Russia, vol. 1452, pp. 96-105.
Kaixuan Liu, et al., "Using Artificial Intelligence to Predict Human Body Dimensions for Pattern Making," Uncertainty Modelling in Knowledge Engineering and Decision Making, Proceedings of the Conference on Uncertainty Modelling in Knowledge Engineering and Decision Making (FLINS 2016), Roubaix, France, Aug. 24-26, 2016, pp. 996-1001.
Likun Xia, et al., "A mobilized automatic human body measure system using neural network," Multimedia Tools and Applications (2019) 78:11291-11311. Sep. 22, 2018. Available at: https://doi.org/10.1007/s11042-018-6645-6.
Proper Cloth LLC, "Proper Cloth, Design the perfect shirt" webpage, Available at: https://propercloth.com/design-a-shirt/, last accessed on Apr. 10, 2017.
Bit Body, Inc., MTailor webpage and mobile application, Available at: https://www.mtailor.com/, last accessed on Apr. 10, 2017.
AFT GMBH, "Tailor4less" webpage, Available at: https://www.tailor4less.com/en/men/custom-dress-shirts/, last accessed on Apr. 10, 2017.
Flex Japan Corporation, "Karuizawa shirt" webpage, Available at: http://karuizawa-shirt.jp/builder, last accessed on Apr. 10, 2017 with Google Translate.
3DLOOK Inc., "3D body scanning in the palm of your hand" webpage, Available at: https://3dlook.me/3dlook-technology/, last accessed on Oct. 9, 2018.
Agisoft, "PhotoScan—photogrammetric processing of digital images and 3D spatial data generation" webpage, Available at: http://www.agisoft.com, last accessed on Oct. 9, 2018.
Gabriel L. Oliveira, et al., "Deep Learning for Human Part Discovery in Images," 2016 IEEE International Conference on Robotics and Automation (ICRA), May 16-21, 2016, Stockholm, Sweden. DOI: 10.1109/ICRA.2016.7487304.
Alexandaer Toshev and Christian Szegedy, "DeepPose: Human Pose Estimation via Deep Neural Networks," IEEE Conference on Computer Vision and Pattern Recognition, 2014. DOI: 10.1109/CVPR.2014.214.
Gut Varol, et al., "BodyNet: Volumetric Inference of 3D Human Body Shapes," European Conference on Computer Vision 2018 (ECCV 2018), 27 pages. arXiv:1804.04875.
Stefanie Wuhrer, et al., "Estimation of Human Body Shape and Posture Under Clothing," Computer Vision and Image Understanding, 127, pp. 31-42, 2014. DOI: 10.1016/j.cviu.2014.06.012.
Alexandru Balan and Michael J. Black, "The Naked Truth: Estimating Body Shape Under Clothing." In: D. Forsyth, P. Torr, and A. Zisserman (Eds.), Computer Vision—ECCV 2008, Lecture Notes in Computer Science, vol. 5303. Springer, Berlin, pp. 15-29, 2008. DOI: https://doi.org/10.1007/978-3-540-88688-4_2.
Masahiro Sekine, et al., "Virtual Fitting by Single-Shot Body Shape Estimation," 5th International Conference on 3D Body Scanning Technologies, Lugano, Switzerland, pp. 406-413, Oct. 21-22, 2014. DOI: 10.15221/14.406.
Hengshuang Zhao, et al., "Pyramid Scene Parsing Network," CVPR 2017, Dec. 4, 2016, Available at: arXiv:1612.01105.
Leo Breiman, "Random Forests," Machine Learning, 45, 5-32, 2001, Kluwer Academic Publishers, Netherlands, Available at: https://doi.org/10.1023/A:1010933404324.

\* cited by examiner

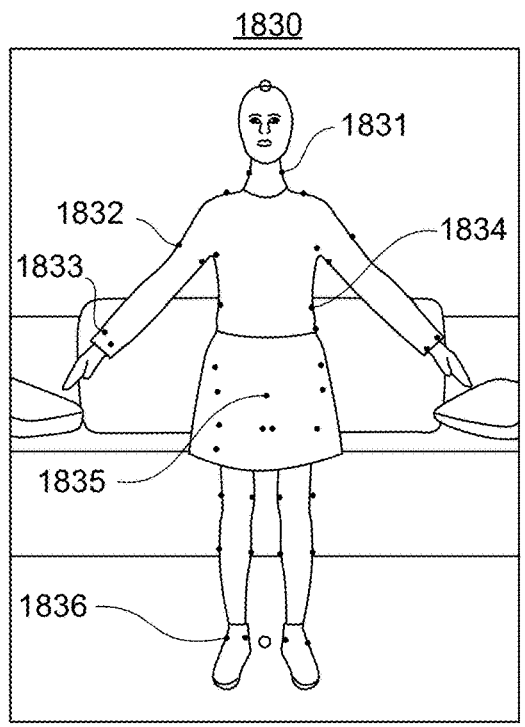
FIG. 18A
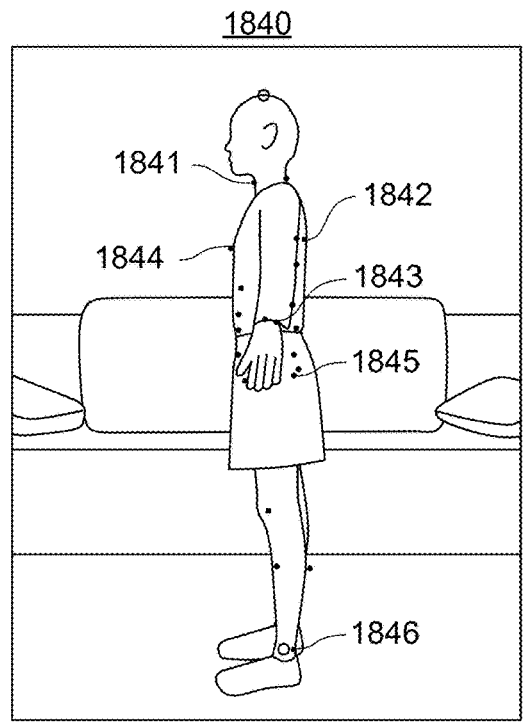
FIG. 18B
| BODY PART | SIZING RESULT [cm] |
|---|---|
| NECK | 33.2227 |
| SHOULDER | 39.7486 |
| SLEEVE | 73.3261 |
| WRIST | 15.3653 |
| BICEP | 25.1505 |
| CHEST | 84.5550 |
| WAIST | 67.7489 |
| HIGH HIP | 741808 |
| HIP | 90.2745 |
| THIGH | 53.2880 |
| THIGH TOP | 46.8228 |
| KNEE | 38.5886 |
| CALF | 362101 |
| TOTAL LENGTH | 134.7371 |
| OUTSEAM | 93.9295 |
| INSEAM | 73.7785 |
FIG. 18C

METHODS AND SYSTEMS FOR GENERATING 3D DATASETS TO TRAIN DEEP LEARNING NETWORKS FOR MEASUREMENTS ESTIMATION

REFERENCE TO RELATED APPLICATIONS

This application is a non-provisional of U.S. Ser. No. 62/929,048, filed on 31 Oct. 2019, and entitled "METHODS AND SYSTEMS FOR GENERATING 3D DATASETS TO TRAIN DEEP LEARNING NETWORKS FOR MEASUREMENTS ESTIMATION."

This application is also a Continuation-In-Part (CIP) of U.S. Ser. No. 16/517,391, filed on 19 Jul. 2019, which issued as U.S. Pat. No. 10,489,683, issued on 26 Nov. 2019, entitled "METHODS AND SYSTEMS FOR AUTOMATIC GENERATION OF MASSIVE TRAINING DATA SETS FROM 3D MODELS FOR TRAINING DEEP LEARNING NETWORKS," which itself claims priority from U.S. Ser. No. 62/780,737, filed on 17 Dec. 2018, entitled "SYSTEMS AND METHODS FOR GENERATING MASSIVE TRAINING DATA SETS FOR TRAINING DEEP LEARNING NETWORKS FOR BODY MEASUREMENTS."

This application is also related to U.S. Ser. No. 16/195,802, filed on 19 Nov. 2018, which issued as U.S. Pat. No. 10,321,728, issued on 18 Jun. 2019, entitled "SYSTEMS AND METHODS FOR FULL BODY MEASUREMENTS EXTRACTION," which itself claims priority from U.S. Ser. No. 62/660,377, filed on 20 Apr. 2018, and entitled "SYSTEMS AND METHODS FOR FULL BODY MEASUREMENTS EXTRACTION USING A 2D PHONE CAMERA."

The entire disclosures of all referenced applications are hereby incorporated by reference in their entireties herein.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the U.S. Patent and Trademark Office files or records, but otherwise reserves all copyright and trade dress rights whatsoever.

FIELD OF THE INVENTION

Embodiments of the present invention are in the field of automated 3D object measurements. Specific embodiments pertain particularly to generating accurate datasets by identifying key point annotations of 2D photos from corresponding 3D models. The datasets are used to train deep learning algorithms that are used to obtain measurements of 3D objects using 2D photos taken with a mobile device.

BACKGROUND OF THE INVENTION

The statements in the background of the invention section are provided to assist with understanding the invention and its applications and uses, and may not constitute prior art.

There are several approaches that have been tried to extract 3D measurements from photos of 3D objects, including utilizing specialized 3D cameras as well as utilizing 2D videos or 2D photos, followed by 2D-to-3D reconstruction techniques to estimate 3D measurements.

A promising new technique described in related U.S. Pat. No. 10,321,728 is to utilize deep learning networks (DLNs) to extract measurements from 2D photos taken using a single mobile device camera. First, a segmentation DLN is used to segment an object or subject from the background. Then, an annotation DLN is used to draw annotation lines corresponding to measurements taken between key points on the object or subject (e.g., a line representing a distance between two shoulders). Finally, a machine learning algorithm on the annotation lines and one or more parameters (e.g., height of a human subject) is used to estimate measurements along the annotation lines. The technique described in U.S. Pat. No. 10,321,728 minimizes user frictions while delivering highly accurate measurements.

However, the deep learning approach for measurements determination requires training data, including segmented and annotated front and side photos, along with corresponding ground truth data, in order to train the deep learning networks. In practice, acquiring the accurate training datasets necessary for training deep learning networks is often not easy. Many photos have to be acquired from willing volunteers, segmented and annotated by human annotators, and matched with collected ground truth data of actual measurements.

Therefore, it would be an advancement in the state of the art to provide a process by which data sets may be usefully generated from 3D scans and 2D photographs of 3D objects to train the deep learning networks for measurements extraction. In this way, accurate data may be collected to create the data sets that may then be used to train the deep learning algorithms for accurate measurements generation.

It is against this background that the present invention was developed.

BRIEF SUMMARY OF THE INVENTION

The present invention relates to methods and systems for generating data sets to train deep learning networks for extracting 3D measurements from 2D photos, taken for example from a mobile device camera. Training deep learning algorithms requires accurate data that is processed using accurate annotation methodologies to annotate key points within the 3D object and the corresponding 2D photos. Methods and systems for generating datasets for training deep learning networks for various types of annotations, for example key points annotation, are disclosed. More particularly, in accordance with one embodiment, a method utilizing a 3D scan model and a corresponding 2D photograph enables generating a training dataset for supervised training of a deep learning network (DLN) for identifying key point annotations, which can then be used for extracting the 3D measurements. Key point annotations comprise a set of points on the 3D object, and corresponding 2D photo, where an annotation (measurement) line can be identified or a measurement is performed. In some embodiments, the measurements can be taken between joints or some other articulating or moving parts of a human body. In this case, the key point annotations can include annotations identifying specific body parts such as, articulating surfaces or joints.

For example, in one embodiment, a 3D body scan of a subject, such as a human subject, is initially captured by a 3D body scanner. In addition, a 2D photograph of the same subject in the same pose, or substantially similar pose, is also captured by a 2D camera device. Rigs or lines originating at a key point on the 3D body scan and ending at another point on the 3D body scan forming a skeleton-like structure are added to the 3D body scan. In an example, each rig can originate at one articulating surface or joint, and terminate at another articulating surface or joint of the 3D body scan. In some embodiments, the rigs can be added to the 3D body scan by an annotator employing a virtual workspace in an image or graphics processing tool, e.g., a 3D computer graphics (CG) tool. In other embodiments, the rigs may be added automatically through a computer processor executing program code. The 2D photograph from the 2D camera device is also provided to the virtual workspace. The annotator can then arrange a virtual camera in the virtual workspace, the 3D body scan with the rigs, and the 2D photograph within the virtual workspace so that the 3D body scan is overlaid on the 2D photograph and aligned with the human subject pictured in the 2D photograph. If necessary, the pose of the subject in the 3D body scan can be adjusted, since the pose in the 3D body scan (taken with a 3D body scanner) is generally not identical to the pose of the 2D photograph (taken separately with a camera device). The virtual camera can be used to capture an image of the 3D body scan with the rigs overlaid on the 2D photograph. A key point, for example for articulating surfaces or joints, can be located at the end points of each rig, where one rig is connected to another rig at an articulating surface or joint. The projection of the key point from the 3D body scan model onto the 2D photograph can be used to identify the corresponding key point location in the 2D photograph.

The superimposed image of the 3D body scan of a specific person with the rigs overlaid or superimposed on the 2D photograph of that person in the same pose can be used as one data point in the training dataset for training a key point annotation DLN. Similarly, other data points can be generated by obtaining 3D body scans and 2D photographs of different subjects. The annotations are used to obtain not only the body measurements, such as width of particular body parts like the neck, waist, wrists, etc., or lengths of the body parts such as the limbs, but can also identify articulating surfaces, such as joints of a given body, which enable movements of body parts. Superimposing the 3D scan model on the 2D photograph can train the key point annotation DLN to extract key points of various body parts of a 3D object from a 2D photograph of the object more accurately, avoiding the distortions or errors that may otherwise occur in the measurements due to clothing or accessories worn by the human subjects, or errors that can be introduced due to the presence of the background. Moreover, the identification of key points at joints can enable manipulating an image of the object into different poses, thereby facilitating better measurements.

The key point annotation DLN can be trained on the training dataset thus generated to provide key point annotations. When the key point annotation DLN is employed for measurement determination, a 2D photograph of a given subject to be measured is initially received. Based on the training from the rigged 3D scan models and the 2D photographs, the key point annotation DLN can output key point annotations which are employed to identify articulating surfaces or joints. Then, additional machine learning algorithms can be utilized to determine the physical dimensions of the various parts of the subject imaged in the 2D photograph, as explained in greater detail below. The key point annotations can include annotation marks that are automatically generated by the key point annotation DLN identifying the various parts of the subject on the 2D photograph or other image processed from the 2D photograph. In the case of a human subject, an improved key point annotation DLN which is trained in accordance with embodiments disclosed herein provides more accurate annotation underneath clothing. Moreover, the key point annotation DLN also enables obtaining key points of different subjects imaged in different poses in different 2D photographs.

While 3D body scanning technology may have advantages over traditional tailor measurements, such as being quick, efficient, and non-contact (using white light or laser technologies), securing user compliance for 3D body scanning can be difficult. Therefore, developing measurement technologies that enable obtaining dimensions of human bodies from just 2D photos, which is more comfortable and familiar to end-users, can be advantageous in various industries including fashion, healthcare, and so forth. Therefore, the present invention generates the datasets needed to enable the deep learning networks to obtain accurate body measurements from end users who simply take 2D photos of themselves using ordinary smart phone cameras.

Accordingly, in one embodiment, a computer-implemented method for identifying key point annotations on two-dimensional (2D) photographs of three-dimensional (3D) objects for generating training data for training deep learning networks is disclosed. The computer-implemented method may be executable by a hardware processor from program code stored on a non-transitory storage medium. The method comprises the steps of receiving a 2D photograph of a 3D object; receiving a 3D scan model of the 3D object; receiving two or more key point annotations on the 3D scan model; aligning the 3D scan model and the 2D photograph of the 3D object; and generating training data for at least one key point annotation deep learning network (DLN) by identifying the two or more key point annotations from the 3D scan model and projecting onto the 2D photograph.

In some embodiments, the 3D object is a 3D subject, and the 3D scan model is a 3D body scan model, and the method further comprises adjusting a first pose of the 3D subject in the 3D body scan model to match a second pose of the 3D subject in the 2D photograph.

In some embodiments, the method further comprises repeating, with a plurality of 3D objects, the steps of receiving the 2D photograph, the 3D scan model, and the key point annotations of the 3D scan model, and aligning the 3D scan model and the 2D photograph; and training the at least one key point annotation DLN for identifying key point annotations using the training data generated from the plurality of 3D objects to generate a trained key point annotation DLN.

In some embodiments, the method further comprises identifying key point annotations of a given 3D object by the trained key point annotation DLN from a given 2D photograph of the given 3D object. In some embodiments, the identifying key point annotations of the given 3D object further comprises accessing a given 2D photograph of the given 3D object by the trained key point annotation DLN; and outputting key point annotations of the given 3D object based on the given 2D photograph.

In some embodiments, the 3D object is a 3D subject comprising a human body. In some embodiments, the 3D scan model is a 3D body scan model of the 3D subject obtained from a 3D body scanner. In some embodiments, the key point annotations identify one or more joints of the 3D subject. In some embodiments, the receiving the two or more key point annotations on the 3D body scan model further comprises receiving one or more rigs, each rig connecting two or more key point annotations, the one or more rigs providing a skeletal structure indicating the one or more joints of the 3D subject on the 3D body scan model. In some embodiments, a given pose of a given 3D subject is different from poses of the 3D subjects used in the training of the at least one key point annotation DLN.

In some embodiments, the at least one key point annotation DLN comprises a plurality of key point annotation DLNs for a respective plurality of object categories. In some embodiments, the method further comprises training each of the plurality of key point annotation DLNs for identifying key point annotations using a plurality of 3D objects belonging to the respective plurality of object categories.

In some embodiments, the method further comprises capturing a corresponding superimposed image of the aligned 3D scan model superimposed over the 2D photograph, wherein the corresponding superimposed image is used in the generating of the training data step. In some embodiments, the capturing of the corresponding superimposed image of the 3D scan model superimposed over the 2D photograph further comprises receiving a virtual arrangement comprising a virtual camera, the 3D scan model, and the 2D photograph; and capturing, using the virtual camera, the corresponding superimposed image of the 3D scan model superimposed over the 2D photograph.

In some embodiments, the generating of the training data for the at least one key point annotation DLN further comprises receiving a plurality of augmentation data for the 2D photograph; and augmenting the 2D photograph with the augmentation data to generate a plurality of augmented 2D photographs, each augmented 2D photograph containing an instance of the augmentation data.

In various embodiments, a computer program product is disclosed. The computer program may be used for generating training data sets for training deep learning networks for spatial feature extraction from two-dimensional (2D) images of a three-dimensional (3D) object, and may include a computer readable storage medium having program instructions, or program code, embodied therewith, the program instructions executable by a processor to cause the processor to perform the steps described herein.

In various embodiment, a system is described, including a memory that stores computer-executable components; a hardware processor, operably coupled to the memory, and that executes the computer-executable components stored in the memory, wherein the computer-executable components may include components communicatively coupled with the processor that executes the steps described herein.

In yet another embodiment, the present invention is a non-transitory, computer-readable storage medium storing executable instructions, which when executed by a processor, causes the processor to perform a process for generating training data sets to train deep learning networks, the instructions causing the processor to perform the steps herein.

In yet another embodiment, the present invention is a system, the system comprising a user device having a 2D camera, a processor, a display, a first memory; a server comprising a second memory and a data repository; a telecommunications-link between said user device and said server; and a plurality of computer codes embodied on said first and second memory of said user-device and said server, said plurality of computer codes which when executed causes said server and said user-device to execute a process comprising the steps herein.

In yet another embodiment, the present invention is a computerized server and/or a user device comprising at least one processor, memory, and a plurality of computer codes embodied on said memory, said plurality of computer codes which when executed causes said processor to execute a process comprising the steps herein. Other aspects and embodiments of the present invention include the methods, processes, and algorithms comprising the steps described herein, and also include the processes and modes of operation of the systems and servers described herein.

Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIGS. 18A and 18B show an illustrative test run on sample 2D images (front view and side views, respectively) of a sample 3D model utilizing a deep learning network (DLN) for body measurement determination after the DLN has been trained.

FIG. 18C shows results of an illustrative test run on the sample 2D images from FIGS. 18A and 18B.

DETAILED DESCRIPTION OF THE INVENTION

Overview

Figure 1:
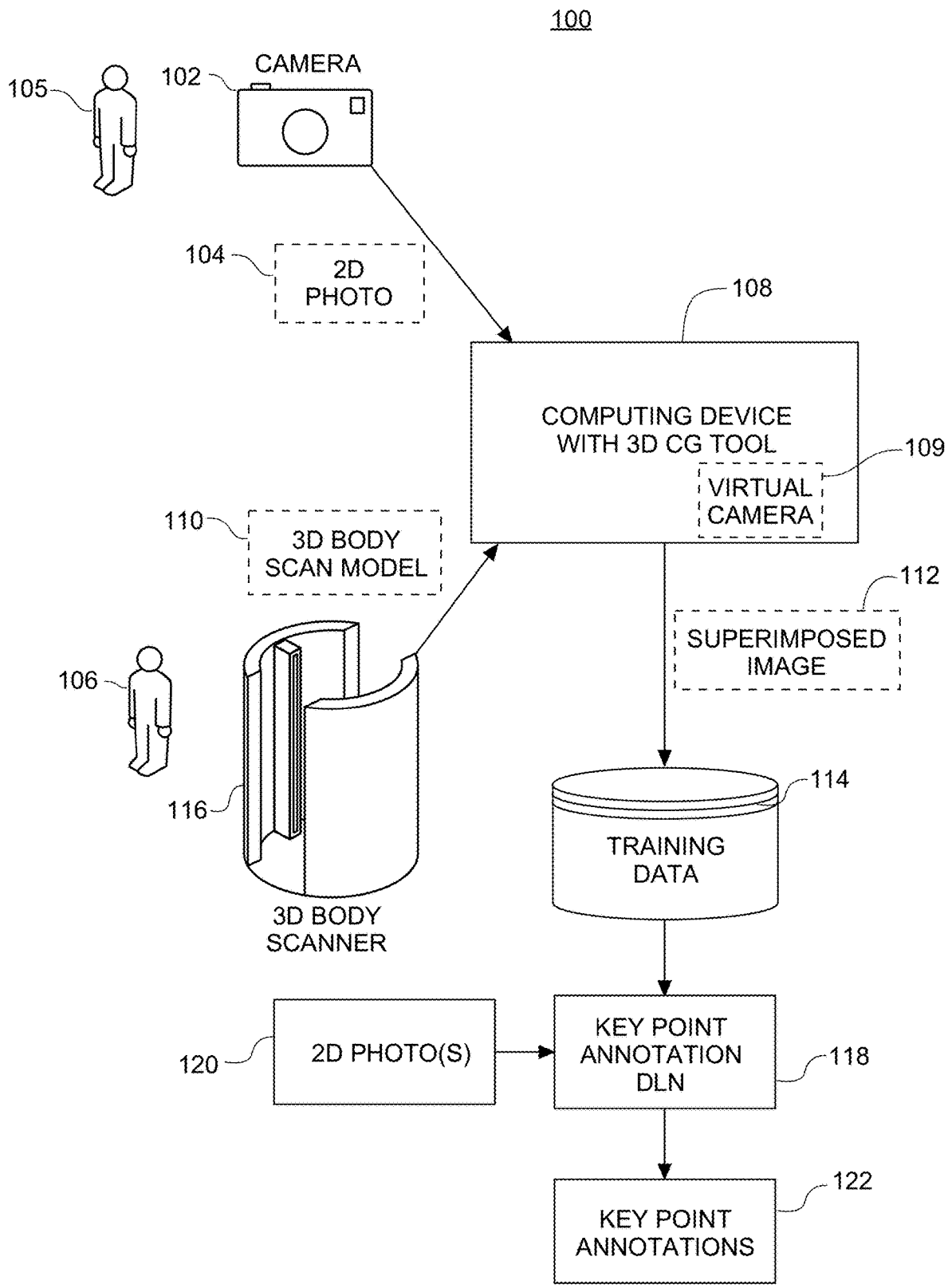
FIG. 1 shows a block diagram of an example 3D annotation training system for training a key point annotation DLN, in accordance with one embodiment of the invention.

With reference to the figures provided, embodiments of the present invention are now described in detail.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

As discussed, others have tried many different types of approaches to generate or extract 1D measurements from 2D images of 3D objects. All of these approaches generally require the user, or an object, to have specific poses, stand at a specific distance from the camera, in front of an empty background; and for a human subject, wear tight fitting clothing, and/or go partially nude. Such requirements for controlled environments and significant user friction are undesirable.

The present invention solves the aforementioned problems by providing a system and method for accurately extracting 1D measurements, such as body measurements, from 2D photos with 1) the object in any pose, 2) the object against any background type, 3) the photos taken at any distance, 4) the object having any type of covering, such as clothing on a human, and 5) the lighting of any position, angle, color, or shadowing, such that everyone can easily take photos of real-world objects or themselves, and benefit from full measurement extraction. In the present invention, advanced computer vision based on deep learning networks (DLNs) is used to generate accurate measurements no matter how the object is placed, or covered, from photos provided from a single mobile device camera. In the present disclosure, the term "2D phone camera," and the like, is used to represent any traditional camera embedded in, or connected to, computing devices, such as smartphones, tablets, laptops, or desktops.

Generating Data Sets to Train Deep Learning Networks for Measurements Estimation In order to implement deep learning networks for measurement determination from 2D photos, training data sets are required to train the deep learning networks. In one embodiment, the present invention provides a method, apparatus, and system for generating training data by identifying accurate 3D key point annotations on 2D photos by "rigging" to a 3D scan model.

FIG. 1 shows a block diagram 100 of an example 3D annotation training system for training an annotation deep learning network (DLN). While FIG. 1 shows an illustrative process utilizing a human subject, any 3D object may be utilized, for example, a living subject, such as an animal, a non-living object, such as a piece of furniture, or any other 3D subject or object.

First, a 3D scan model 110 of an object 106, e.g., a human subject 106 in a specific pose, such as the "A-pose," is initially obtained using a 3D body scanner 116. The 3D body scanner 116 can include a 3D scanning system configured to capture the full body of a subject in three dimensions for measurement purposes. 3D body scanners can work on various technologies such as white light technology, laser technology, etc., for scanning and visualization of body shapes. The result obtained is an accurate 3D model 110 (also known as a "3D avatar"), representing a virtual model of the 3D body shape, and allows for extracting accurate data such as body measurements, posture analysis, etc. Examples of 3D body scanners useable with the present invention include, but are not limited to, 3dMDbody System manufactured by 3dMD, Optaone manufactured by Botspot, Size Stream SS20 manufactured by Size Stream, TC2 3D Body Scanner manufactured by TC2 Labs, and so on. In some examples, the 3D body scan model 110 can be exported into external systems for further manipulation.

Next, a 2D photograph 104 of the same object 105, such as the human subject 105, in a same pose, or a substantially similar pose, is captured by a camera device 102. The camera device 102 as mentioned herein, can be any camera included in a computing device, or even a standalone camera device that produces a digital image of the subject 105.

The 3D body scan model 110 is received by a computing device executing a virtual workspace of a 3D image processing software, such as a 3D computer graphics (CG) tool 108. Examples of the 3D CG tool can include 3DS Max, Maya, or other computer graphics or modelling software. Rigs or lines connecting one point on the 3D body scan model 110 to another point, e.g., one joint of the 3D body scan model 110 to another joint, are added by a user employing the 3D CG tool 108. 3D rigging is the process of creating a skeleton for a 3D model, such as the 3D body scan model 110, where the skeleton can include various points of articulation, such as joints. Rigging can involve creating or identifying joints which are the points of articulation within the 3D body scan model 110. For example, while rigging the 3D body scan model 110, the user may place a joint at the upper arm, a joint at the elbow, and another joint at the wrist. While it is illustrated herein that the same 3D CG tool 108 is used for rigging and for generating the superimposed image 112, it can be appreciated that this is not necessary. Different 3D CG tools or other image editing software can be used for processing the 3D body scan model 110, where one of the 3D CG tools is used for drawing the rigs while another one of the image editing software can be used for superimposing the 3D body scan model 110 on the 2D photograph 104. Alternatively, in some embodiments, the rigging, adjusting, and/or superimposing may be performed automatically using a processor executing program code. Since the 3D body scan model contains all 3-dimensional information of the human subject, the program code can be utilized to automatically extract the articulating points or joints of the 3D body scan model.

Next, the 3D body scan model 110 and the 2D photograph 104 are arranged on a virtual workspace within the 3D CG tool 108 along with a virtual camera 109 provided in the 3D CG tool 108. The user can align the 3D body scan model 110 with the human subject in the 2D photograph 104. That is, the 3D body scan model 110 is superimposed on the 2D photograph 104 so that the outlines of the 3D body scan model 110 coincide with the outlines of the human subject in the 2D photograph 104 to the extent permissible by the respective media, in that the 3D body scan model 110 is obtained as a naked avatar with a smooth outline of the subject 106, whereas the 2D photograph 104 shows the same subject 105 in clothes, and as a result may have a fuzzy or broader outline. The virtual camera 109 can be used to capture a superimposed image 112 of the 3D body scan model 110 along with the rigs aligned with the 2D photograph 104.

If necessary, a first pose of the 3D body scan model 110 can be adjusted using the rigs by matching the rigs in the 3D body scan model 110 to a second pose of the same subject 105 in the 2D photograph 104. Since the first pose in the 3D body scan model 110 is generally not identical to the second pose of the same subject in the 2D photograph 104, some adjustment of the pose is usually necessary. For example, the 3D body scan model 110 is obtained from a 3D body scanner 116, with a nude or partially nude subject in the 3D body scanner 116 to obtain the complete body outlines. However, the 2D photograph 104 is captured with the same subject 105 wearing clothing in an environment outside of the 3D body scanner 116 and against a normal background. The subject 105 in the 2D photograph 104 is unlikely to maintain the exact same pose as the same subject 106 in the 3D body scanner 116, since these two operations are performed at different points in time.

Finally, the superimposed image 112 and associated key point annotations may be added to training data 114 along with the 2D photograph 104 in order to train a key point annotation DLN 118. Later, the trained key point annotation DLN 118 may be used to identify and annotate key points 122 in response to receiving a given 2D photo 120 of a given subject without the need for a 3D body scanner 116.

Although the generation of only a single data point including one 3D body scan model 110 and one 2D photograph 104 is described, thousands of such data points can be generated and added to the training data 114 in order to train the key point annotation DLN 118 to identify the key point annotations in a given 2D photo 120. An even large volume of training data can be generated using the augmentation techniques in accordance with the various embodiments described below.

In one embodiment, different key point annotation DLNs 118 can be trained to identify key point annotations for different categories of objects. For example, a key point annotation DLN 118 may be trained to identify and annotate key points of human subjects. Another key point annotation DLN 118 may be trained to identify and annotate key points of another object category, which may include another living being, such as an animal. Yet another key point annotation DLN 118 may be trained to identify key point annotations of a non-living category item, such as a piece of furniture. Each of these key point annotation DLNs 118 can be employed in downstream measurement processes for the particular object category for which the key point annotation DLN 118 was trained.

Figure 2:
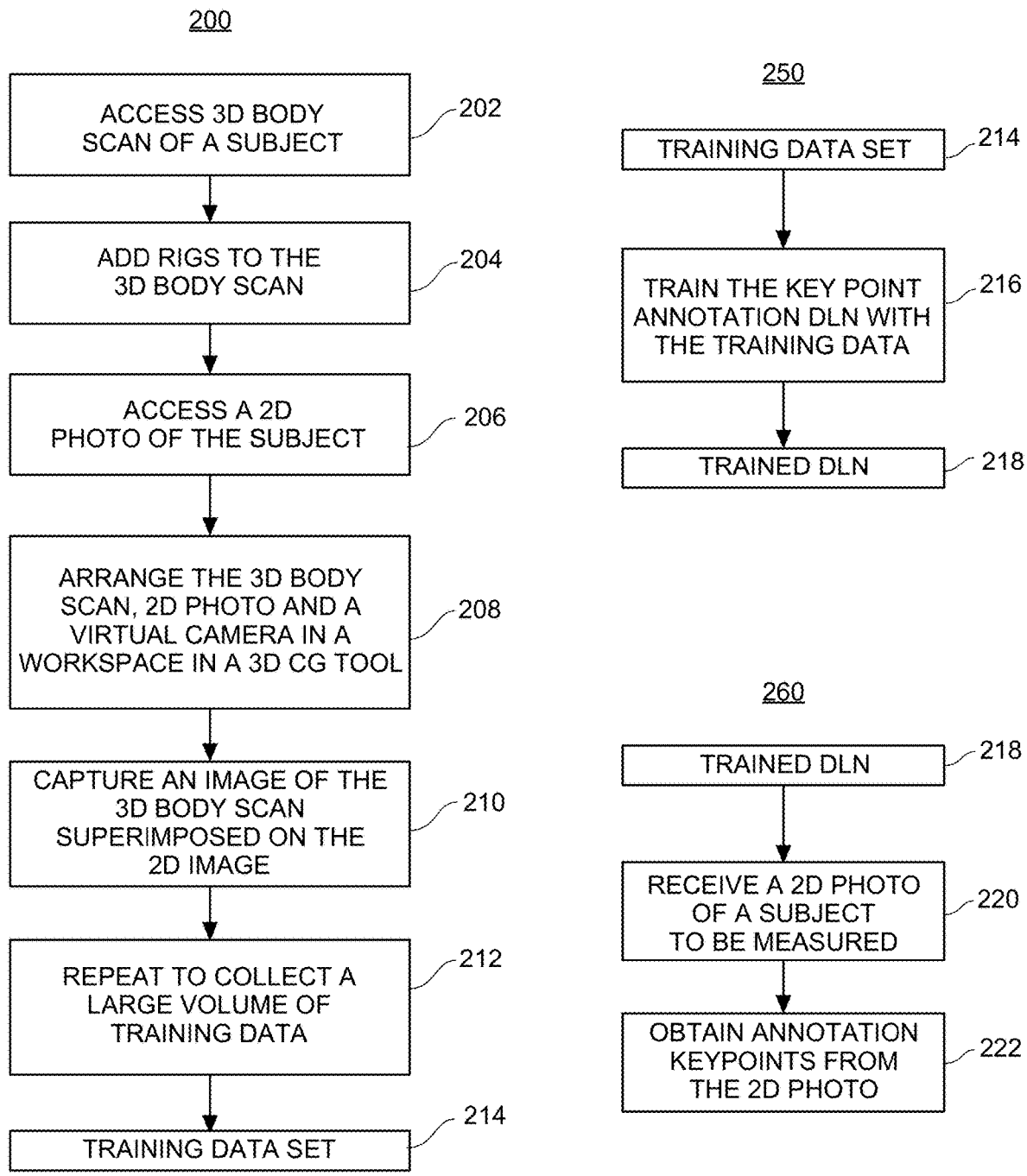
FIG. 2 shows an example flow diagram for obtaining key point annotations from a 2D photograph and 3D scan model, in accordance with one embodiment.

FIG. 2 shows an example flow diagram 200 for obtaining key point annotations on a 2D photograph from a corresponding 3D scan model, in accordance with one embodiment of the invention. In short, the process shown in flow diagram 200 comprises the following high-level steps:

1. Obtain a 3D scan by a 3D body scanner of a subject.
2. Obtain a 2D photo from the same subject with almost the same pose to 3D scan.
3. Add rigs to the 3D body model, and place it in a 3D CG tool together with the 2D photo.
4. Adjust the pose of 3D body model to fit the body shape shown in the 2D photo.
5. Save the pose-adjusted 3D body model, and obtain any accurate 3D key point annotations from the pose-adjusted 3D body model.

In more detail, FIG. 2 shows an example flow diagram 200 for obtaining key point annotations on a 2D photograph from a corresponding 3D scan model, in accordance with one embodiment of the invention. At step 202, a 3D body scan model of a subject is accessed. In an example, a 3D body scanner can produce the 3D body scan model, which can be exported in various formats including but not limited to, American Standard Code for Information Interchange (ASCII), object (OBJ), stereolithography (STL), drawing exchange format (DXF) formats, and so on. In another example, the 3D body scan model can be stored into a data store from which it can be accessed by a computing device running the 3D CG tool. The 3D CG tool can include user interface controls that are operated by a user to add rigs to the 3D body scan model at step 204. The rigs enable identifying joints between the various parts of a body, thereby determining the articulating surfaces. As a result, a 3D body scan of an individual which is obtained in one pose can be manipulated into another pose by articulating the body parts at the key points.

Figure 3:
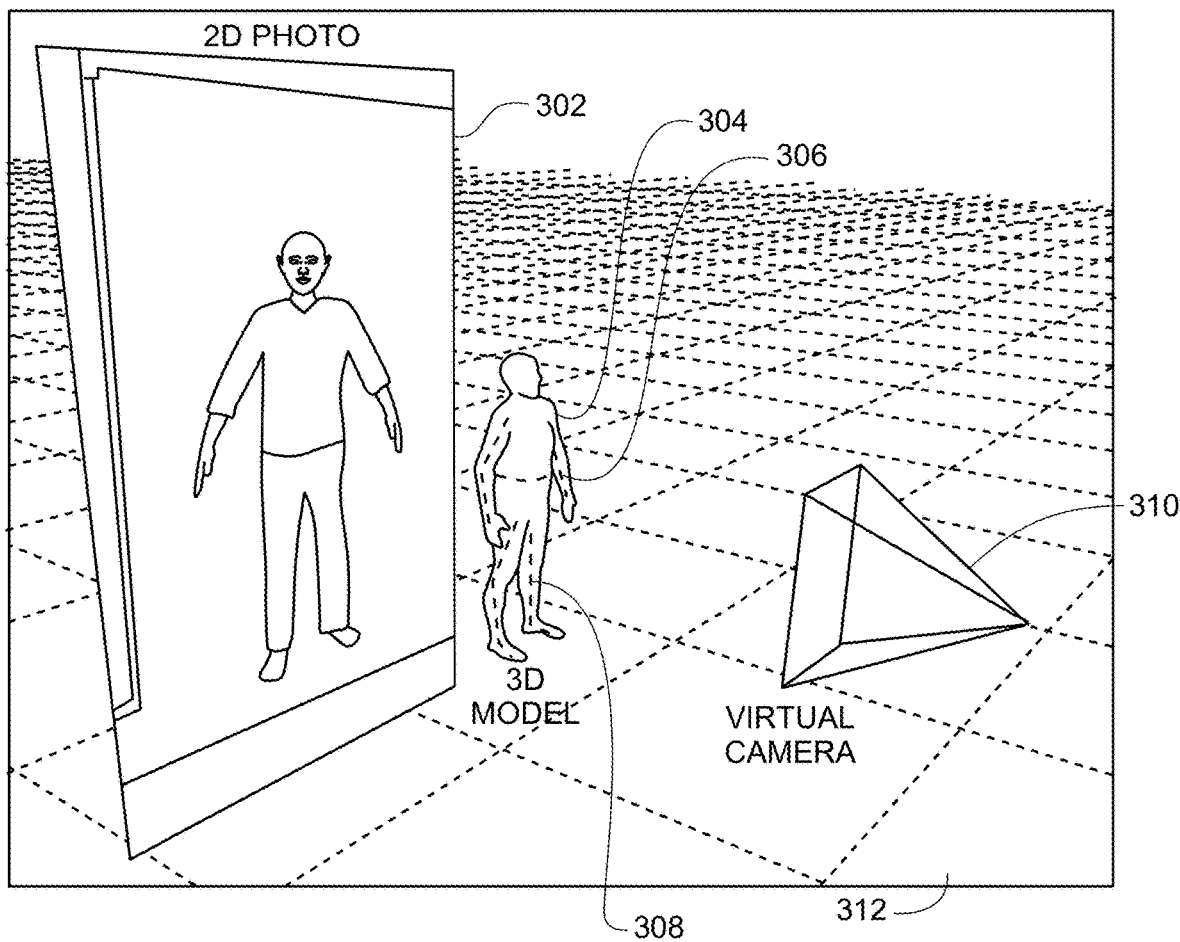
FIG. 3 shows a virtual arrangement of a virtual camera, a 3D scan model, and a 2D photograph in a virtual workspace, in accordance with one embodiment.

A 2D photograph of the same subject in the same pose, or substantially similar pose, as captured in the 3D body scan is accessed at step 206. The 2D photograph can be received by the 3D CG tool directly from a camera device via wired or wireless networks, or the 3D CG tool can access the 2D photograph from a data store. The 3D body scan model, the 2D photograph, and a virtual camera is provided in a virtual arrangement in a workspace within the 3D CG tool (as shown in FIG. 3) at step 208. If necessary, a first pose of the 3D body scan model is adjusted to substantially match a second pose of the same subject in the 2D photograph. An image of the 3D body scan model superimposed on the 2D photograph is captured by the virtual camera at step 210. Similarly, the process steps 202 through 210 are repeated so that a large volume of training data, including the 3D body scans superimposed on the corresponding 2D images of the same subjects in the same poses, are collected at step 212. In an example, the different 3D body scans and their corresponding 2D photographs can show objects of a particular object category in different poses. However, certain constraints such as clear visibility of the joints may be required in order to be included in the training data. Finally, the data points thus generated are aggregated into a training data set and output at step 214. The training data set may be used to train one or more key point annotation deep learning networks (DLNs) as described next.

FIG. 2 also shows a process 250 for utilizing the training data set generated in process 200 to train a deep learning network (DLN). At step 214, the training data generated in process 200 is received. At step 216, the training data is used to train a key point annotation DLN. Finally, at step 218, the trained key point annotation DLN is output for later use.

FIG. 2 also shows a process 260 for utilizing the trained key point annotation DLN generated in process 250. At step 218, the trained key point annotation DLN generated in process 250 is received. At step 220, a given 2D photograph of a given subject to be measured is received by the trained key point annotation DLN. Finally, at step 222, the key point annotations for the given subject are obtained from the given 2D photograph using the trained key point annotation DLN. The key point annotations may then be output for use in downstream processes, such as the body measurement process described below.

FIG. 3 shows a diagram 300 of an illustrative virtual workspace 312 within a 3D CG tool in accordance with one example. The virtual workspace 312 shows an arrangement comprising a virtual camera 310, a 3D body scan model 304 with the rigs 306, 308, etc., shown in dotted lines, and a corresponding 2D photograph 302. The 3D body scan model 304 is aligned with the 2D photograph 302 as shown. If necessary, a first pose of the 3D body scan model 304 is adjusted to substantially match a second pose of the same subject in the 2D photograph 302. The virtual camera 310 captures an image of the pose-adjusted 3D body scan model 304 superimposed on the 2D photograph 302 to generate a corresponding superimposed image.

Figure 4:
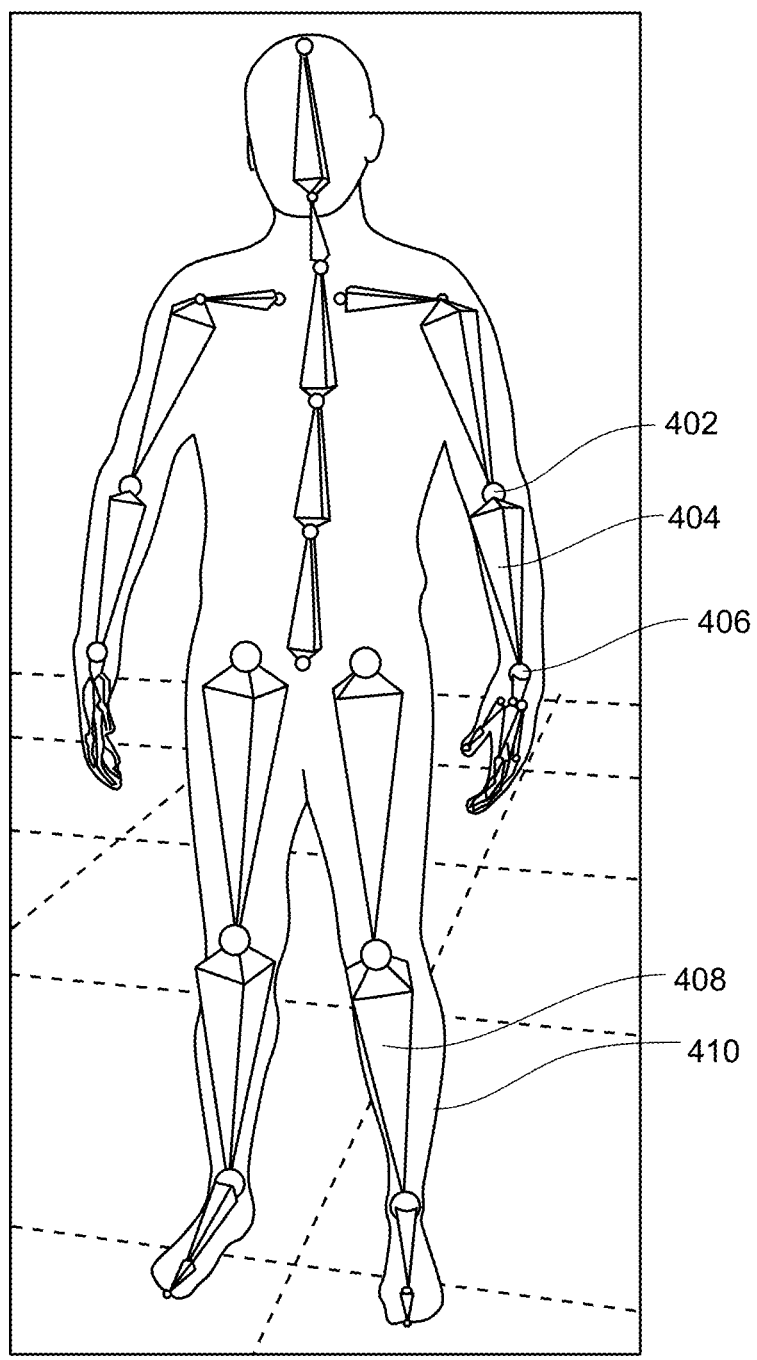
FIG. 4 shows an example of a 3D body scan model with rigs added corresponding to key points in the 3D body scan model, in accordance with one embodiment.

FIG. 4 shows a diagram 400 showing an example of a 3D body scan model 410 with one or more rigs, such as rig 404 and rig 408. Each rig, for example, rig 404 connects two joints, a first joint represented by a first key point 402 and a second joint represented by the second key point 406. The rig 404 and rig 408 may be used to adjust a first pose of the 3D body scan model in order to match a second pose of the same 3D subject in a corresponding 2D photograph.

Figure 5:
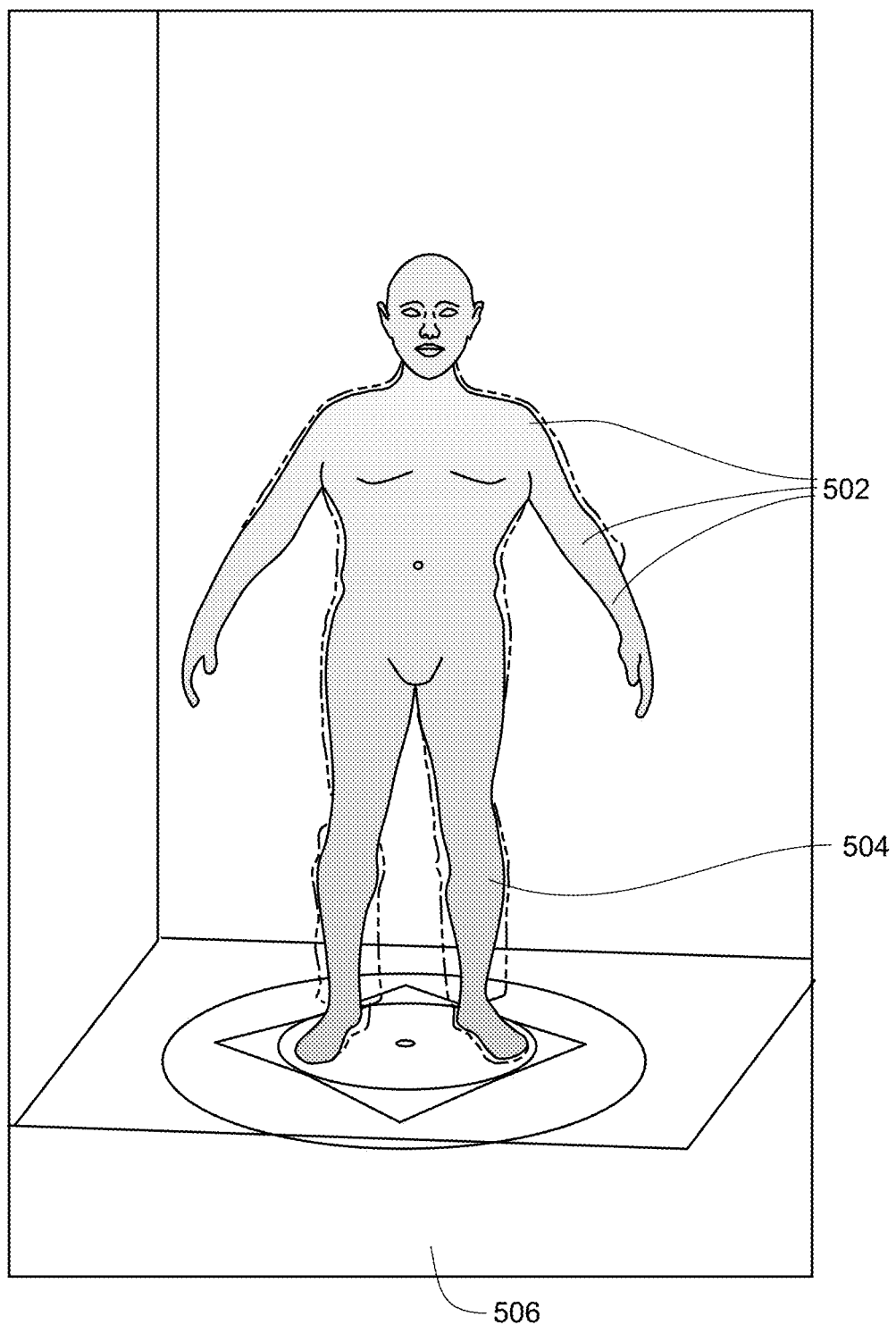
FIG. 5 shows an image generated by adjusting a first pose of the 3D body scan model (shown as a 3D body mesh) to match a second pose of the same 3D subject in the 2D photograph, in accordance with one embodiment.

FIG. 5 shows an image 500 generated by adjusting the first pose of the 3D body scan model 504 (shown as a 3D body mesh) to match the second pose of the same 3D subject in the corresponding 2D photograph 506 (shown in dashed lines in the background). The 3D body scan model 504, by being overlaid on top of the 2D photo 506 in the virtual workspace may be aligned, for example, by aligning the key points 502 associated with a rig on the 3D body scan model 504 with the underlying 2D photograph 506. The subject in the underlying 2D photograph 506 is shown in dashed lines.

Figure 6:
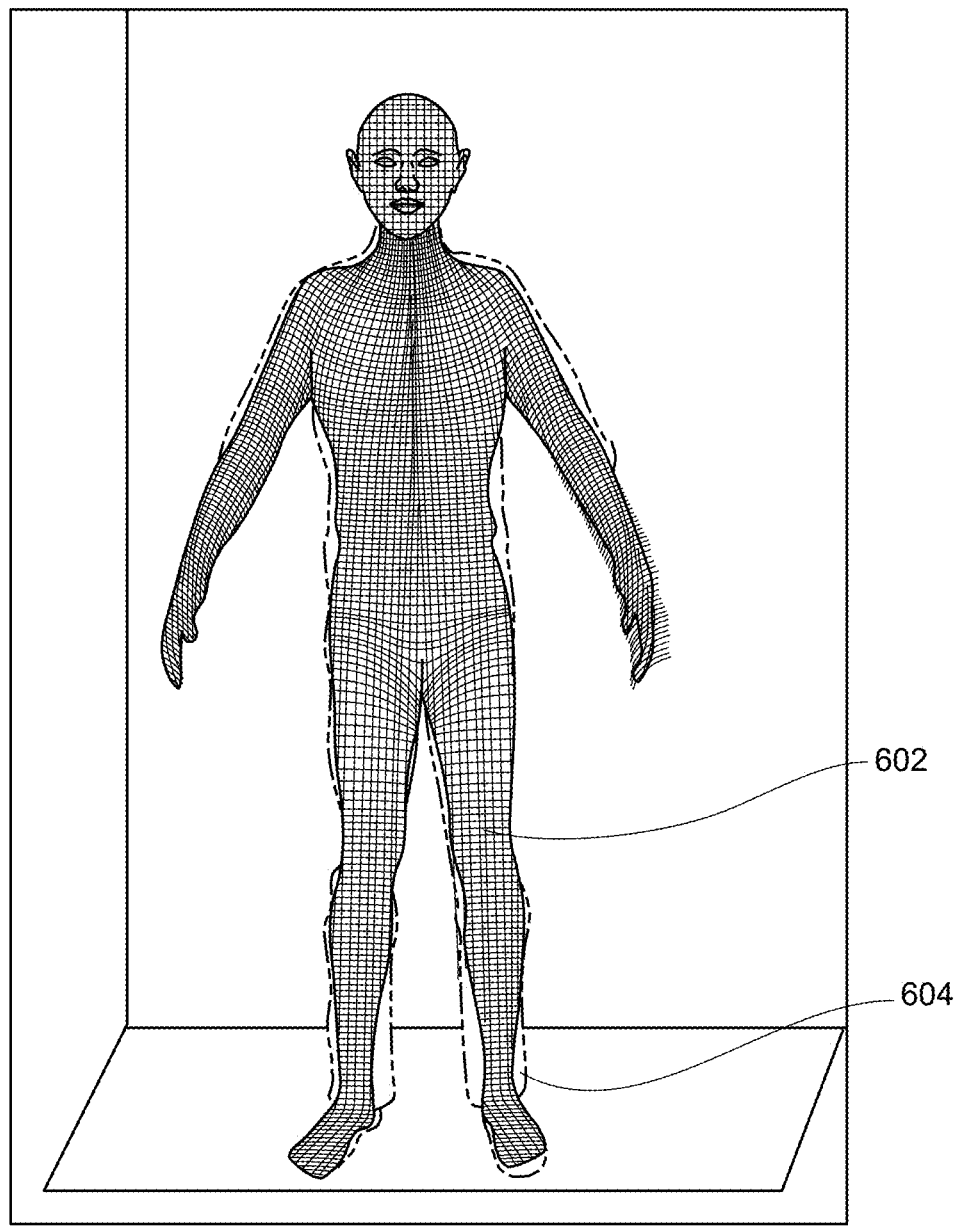
FIG. 6 shows a superimposed image generated by aligning the pose-adjusted 3D body scan model (shown as a 3D wire frame) with the 2D photograph, in accordance with one embodiment.

FIG. 6 shows an example of a superimposed image 600 generated by aligning the pose-adjusted 3D body scan model 602 (shown as a 3D wire frame) with the 2D photograph 604. The subject in the underlying 2D photograph 604 is shown in dashed lines. By superimposing an image of the 3D body scan model 602 with the same subject in the same pose, or a substantially similar pose, in the underlying 2D photograph 604, it can be seen that the various articulating surfaces or joints of the 3D body scan model 602 are placed to coincide with the corresponding articulating surfaces of the 2D photograph 604, thereby enabling training the key point annotation DLN to identify key points from an unknown 2D photograph. Many such superimposed images can be generated and used as training data for the key point annotation DLN.

Figure 7:
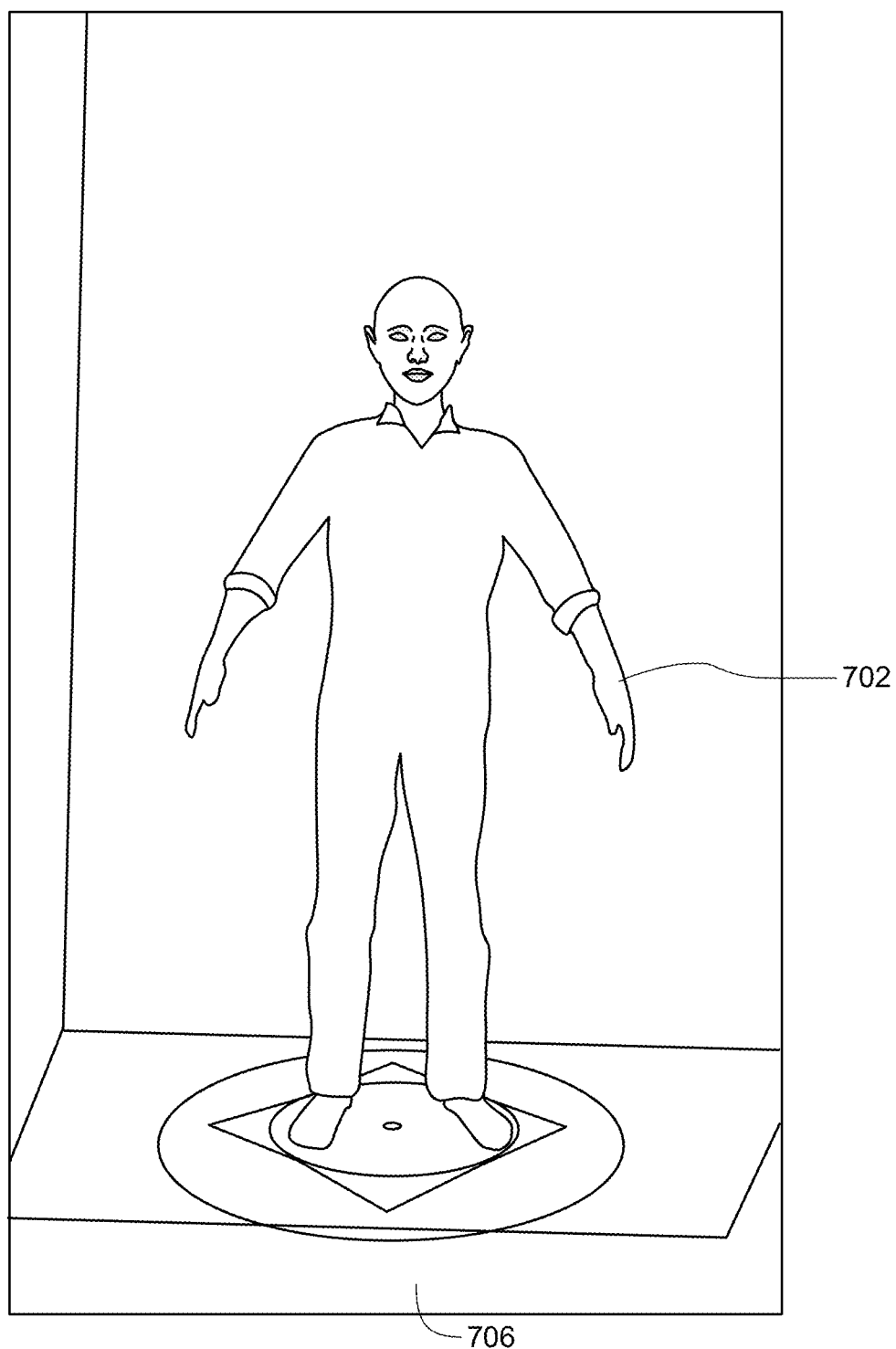
FIG. 7 shows the same superimposed image generated by aligning the 3D body scan model (shown as a 3D overlay with alpha channel) with the 2D photograph, in accordance with one embodiment.

FIG. 7 shows the same superimposed image 700 generated by aligning the 3D body scan model 702 (shown as a 3D overlay with alpha channel) with the 2D photograph 706. The pose of the subject in the 3D body scan model 702 is aligned and overlaps with the same underlying subject in the 2D photograph 706. The underlying subject in the 2D photograph is visible through the overlapped 3D model (overlaid with alpha channel).

Similarly to the key point annotations, the body parts can be segmented from the background and underneath the clothing using the 3D body model to train the segmentation DLN described below by projecting body parts from the 3D body scan model to the underlying 2D photograph. Annotation lines can be drawn on the 2D photograph to train the annotation DLN described below by projecting measurement or annotation lines from the 3D body scan model to the underlying 2D photograph. Real-world measurements ("ground truth data") can be extracted from the 3D body model to use in training the sizing machine learning modules described below. In short, any relevant body part feature, dimension, measurement, segmentation map, annotation line, and so forth can all be extracted from the 3D model, and projected onto the 2D photograph that it is rigged to. This enables the training of the various deep learning and machine learning components used later in body measurement extraction as described below.

Examples of key point and measurement line annotations generated by the trained key point annotation DLN from the 2D photograph of the subject are described below in relation to segmentation and annotation DLNs for body measurements. Initially, the 3D body scan model and 2D photograph with the key point annotations is used as training data as described above. The key point annotations identify the various joints which enable movement of the body parts of the subject. The 3D subject in the 2D photograph is labeled using key points which enable determining the shape and skeleton key points of the 3D subject under the clothing. Annotation lines, corresponding to measurement lines, can then be drawn between the keypoints identified by the key point annotation DLN. Once the key points are identified and the annotation lines are drawn, the body measurements can then be extracted using the processes described in detail in relation to FIGS. 22-25. It may be noted that the pose of a new subject may be similar, but not identical, to the pose of the 3D body scan models trained on. Upon being trained, the key point annotation DLN, is able to identify and annotate key points of subjects belonging to a particular object category, e.g., humans, based on a 2D image regardless of the posture of the subject in the 2D image.

Key point annotations may be used to label skeletal features, automotive parts, furniture, or any other 3D object of interest. It will be appreciated that many 3D objects are within the scope of the methods and processes disclosed herein.

It will be further appreciated that while a visible sample of the superimposed 2D image is shown for illustrations purposes, the virtual workspace need not necessarily create a visible output as shown, but may simply identify the key points using program code, for example, in terms of (x,y) coordinates or other identification data, and provide the identification data to the downstream processes such as feature identification or feature measurements, etc. That is, in some embodiments, no GUI (graphical user interface) is needed, and no human intervention is required to perform the aforementioned steps.

Amplifying Data Sets for Training Deep Learning Networks for Measurements Estimation Another difficulty with implementing deep learning networks for measurement determination from 2D photos is the vast size of training datasets required to train the deep learning networks. For example, the methods and processes described above only generate one single data point from a single 3D body scan. However, typical training methodologies for machine learning applications requires thousands, millions, or even billions or more of valid data samples. Accordingly, one embodiment solves these problems by providing a method, apparatus, and system for greatly magnifying the amount of training data available from smaller samples of training data. For example, in one embodiment, a few thousand 3D scans can be utilized and amplified to generate millions (or more) training data points. In general, some embodiments can be utilized to magnify by hundreds or thousands of times or more the amount of training data available.

Therefore, and in accordance with one embodiment, from a single 3D base-mesh model from a data set—using skin augmentation, face augmentation, hair augmentation, light augmentation, multiple virtual clothing, and/or multiple virtual backgrounds—multiple datasets may be generated. The result is that from just a single 3D model (for example, one body scan), many thousands or even millions of training data set may be generated. In summary and according to one aspect, the present invention is a virtual space and human augmentation system for deep learning (DL) and machine learning (ML) dataset generation.

Figure 8:
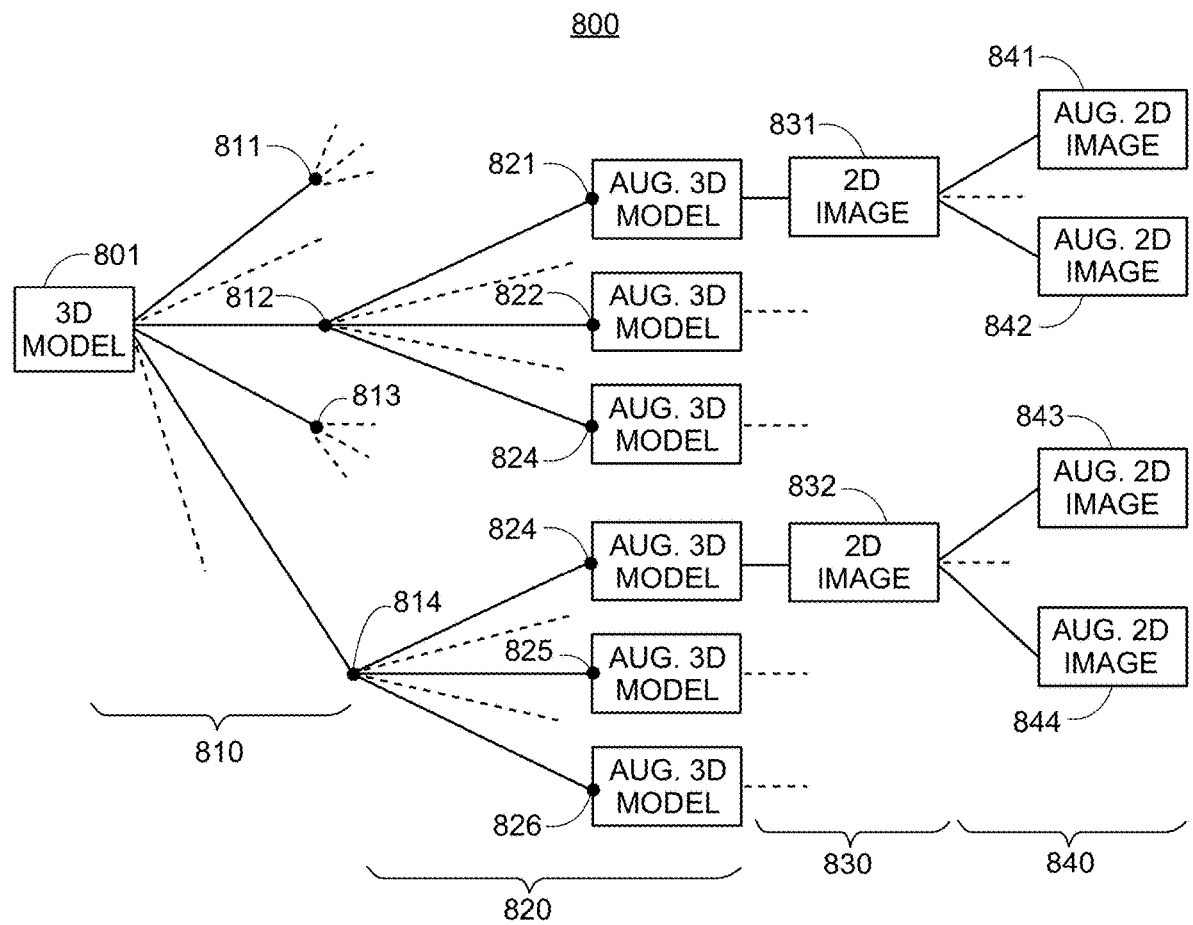
FIG. 8 shows an example tree that demonstrates stages for generating large data sets from smaller data sets for training deep learning networks for body measurement determination, in accordance with one embodiment.

Accordingly, FIG. 8 shows an example tree 800 that demonstrates stages for generating large data sets for training deep learning networks for measurement determination, in accordance with one embodiment of the invention. First, a 3D model 801 is received. At step 810, a first type of augmentation data, comprising a plurality ($P_1$) of options, is generated, and the 3D model 801 is augmented with each option to generate a plurality ($P_1$) of a first stage of augmented 3D models 811-814. At step 820, which may be optional, another type of augmentation data, comprising a plurality ($P_2$) of options, is generated, and the plurality ($P_1$) of first stage augmented 3D models 811-814 are again augmented with each option in the plurality ($P_2$) of options to generate a plurality ($P_1*P_2$) of a second stage of augmented 3D models 821-826. At step 830, at least one 2D image is generated from each of the plurality ($P_1*P_2$) of augmented 3D models by performing projections of the 3D model to generate a plurality ($P_1*P_2$) of 2D images 831-832. At step 840, a second type of augmentation data, comprising a plurality (Q) of options, is generated, and the plurality ($P_1*P_2$) of 2D images 831-832 are augmented with each option in the plurality (Q) of options to generate a plurality ($P_1*P_2*Q$) of augmented 2D images 841-844. Thus, from a single 3D model 801, a large number ($P_1*P_2*Q$) of augmented 2D images may be generated to be included as training data to be used in training deep learning networks. Various embodiments of processes that generate the example tree 800 are further described below.

Figure 9:
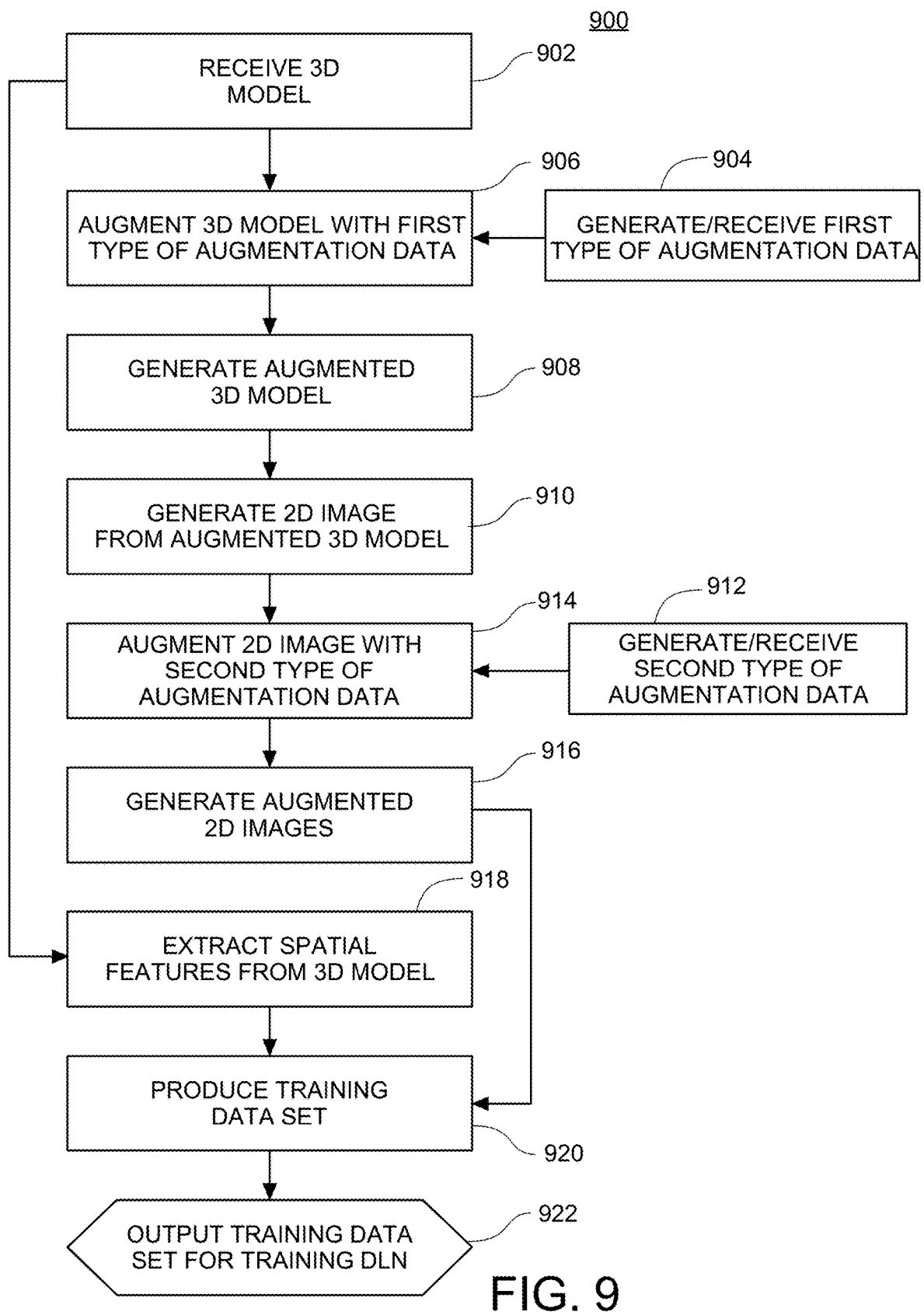
FIG. 9 shows an example flow diagram for generating massive data sets for training deep learning networks for spatial feature determination for a 3D model, in accordance with one embodiment.

FIG. 9 shows an example flow diagram 900 for generating massive data sets for training deep learning networks for spatial feature determination for a 3D model, in accordance with one embodiment of the invention. A 3D model 902 is received. The 3D model 902 may be a variety of 3D objects, such as a human body, an animal (e.g. dog, cat), furniture (e.g. sofa, table), a vehicle (e.g. automobile, motorcycle), or a musical instrument (e.g. piano), and so forth. For example, in one embodiment, a 3D human body model may be obtained from a 3D body scanner (not shown).

In the case of a 3D human body model, and according to some embodiments, 3D body scan data from the "SizeUSA" data set, which is a commercial sample of 3D body scans obtained on about 10,000 human subjects (both male and female), may be utilized as the source of the 3D models. In other embodiments, 3D body scan data from the "CAESAR" data set may be utilized, which is another commercial sample of 3D body scans obtained on about 4,000 human subjects, and also includes manually-measured ground truth data using a human tailor. In yet other embodiments, an organization utilizing the present invention may capture and/or generate their own 3D models of any 3D objects of interest using their own 3D body scanners as described above.

At step 904, a first type of augmentation data, comprising a plurality ($P_1$) of options, is generated. Examples of the first type of augmentation data for 3D human body models are described below. At step 906, the 3D model 902 is augmented with each option to generate at step 908 a plurality ($P_1$) of a first stage of augmented 3D models 811-814.

At step 910, a plurality ($P_1$) of 2D images 831-832 is generated from the plurality ($P_1$) of the first stage of augmented 3D models. The generation may be executed by, for example, performing projections of the 3D model onto a plane (front plane or side plane) using, for example, orthographic projection. In some embodiments, both front and side images are taken.

At step 912, a second type of augmentation data, comprising a plurality (Q) of options, is generated, and at step 914, the plurality ($P_1$) of 2D images 831-832 are augmented with each option in the plurality (Q) of options to generate a plurality ($P_1*Q$) of augmented 2D images 841-844.

In some embodiments, the second type of augmentation data may be, for example, a plurality (Q) of background images. The background images represent a variety of potential backgrounds that may be observed by subjects in real environments. The background images should be representative of various lighting, shading, locality, and other background conditions that are typical of subjects taking spatial features, such as body measurements. A variety of backgrounds should be selected to optimize the training of the deep learning networks, in particular the segmentation deep learning network, at body segmentation, as described below. A background image from the plurality (Q) of background images received at step 912 is added to the front and side images from step 910 to generate $2*P_2$ images with a given background. At step 914, this process is repeated for the plurality (Q) of background images, that is, Q times, to generate a total of $2*P_1*Q$ images.

In some embodiments, the second type of augmentation data may be, for example, white noise or other types of random noise. This may be useful in rendering the deep learning network more robust to imperfect image capturing and other environmental conditions. In other embodiments, the second type of augmentation data may be, for example, perspective distortion data.

At step 918, spatial features are extracted from the 3D model to serve as "ground truth" data for training the annotation deep learning network and machine learning modules described below. In some embodiments, the spatial features are 1D measurements and corresponding annotation lines, such as shirt size, hat size, waist size, or chest size of a human body model. The 1D measurement may be extracted from the 3D model by performing a virtual measurement of the corresponding desired measurement along any given "virtual" annotation line in the 3D model, analogously to how a human tailor would measure a real 3D human body.

By combining the $2*P_1*Q$ images from step 916 with the 1D measurements ("ground truth data") from step 918, it is possible to generate a plurality ($2*P_1*Q$) of training data for training the deep learning networks from just one 3D model, as shown in step 920. Finally, in step 922, the training data set is ready for use in training deep learning networks.

Figure 10:
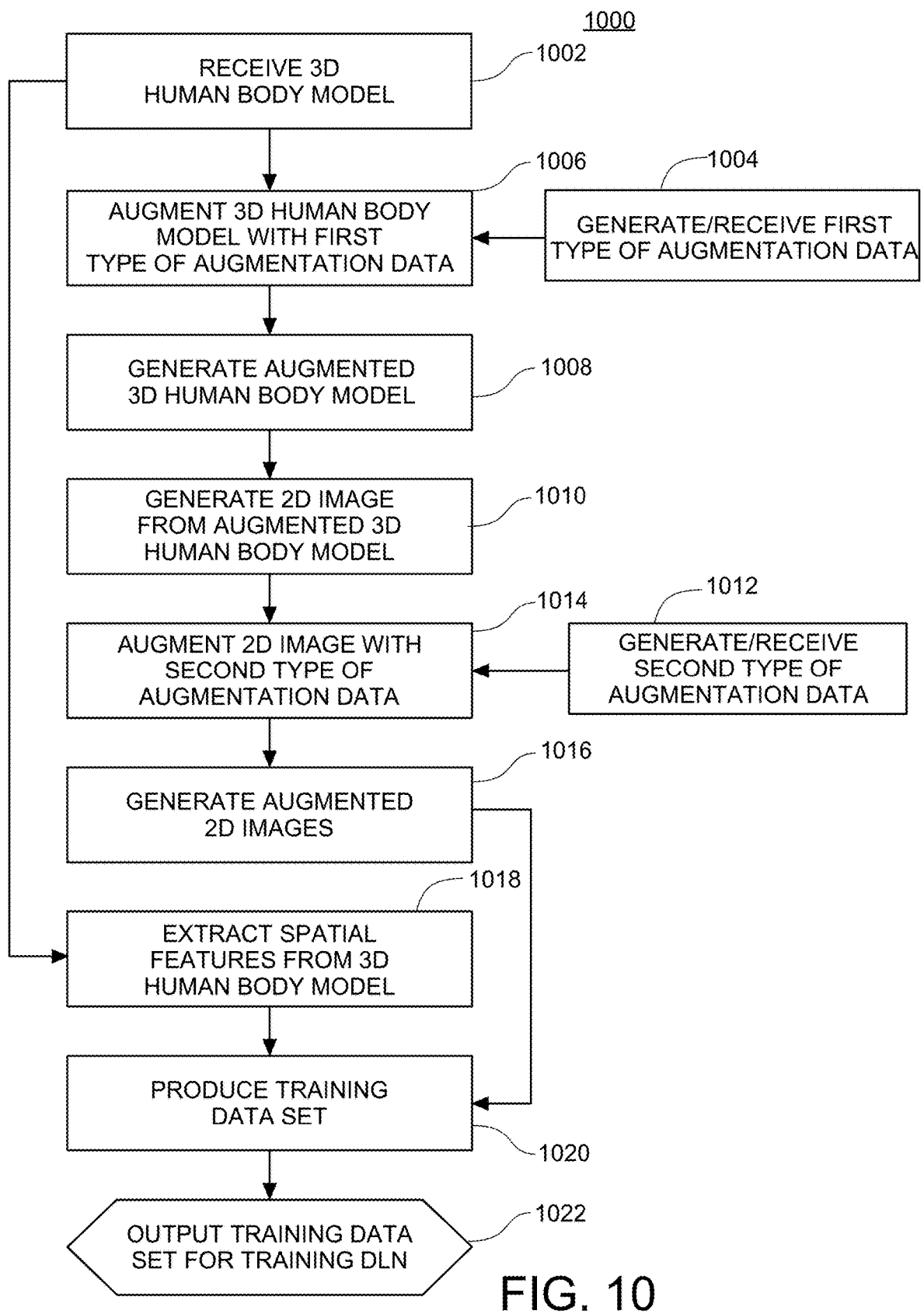
FIG. 10 shows an example flow diagram for generating massive data sets for training deep learning networks for spatial feature determination for a 3D human model, in accordance with one embodiment.

FIG. 10 shows an example flow diagram 1000 for generating massive data sets for training deep learning networks for spatial feature determination for a 3D model, in accordance with one embodiment of the invention. Examples of the first type of augmentation data for 3D human body models include skin colors, face contours, hair styles and colors, virtual clothing, and lighting conditions. In one embodiment, at step 1004, a plurality (U) of skin colors is generated, representing a variety of potential skin colors a subject might have. These skins colors may cover the range of skin colors naturally present in human subjects, as well as colors produced by other means, such as tanning or tattooing. At step 1006, the plurality (U) of skin colors generated in step 1004 is added to the 3D body model 1002 to generate a plurality (U) of augmented 3D human body models that include various skin colors at step 1008.

In another embodiment, at step 1004, a plurality (V) of face contours is generated, representing a variety of potential face contours a subject might have. Such face contours may include, for example, the shapes of the eyes, nose, cheeks, chin, jawline, mouth, and forehead. The face contours are also independent of the body shape of the 3D body model 1002. At step 1006, the plurality (V) of face contours generated in step 1004 is added to the 3D body model 1002 to generate a plurality (V) of augmented 3D human body models that include various face contours at step 1008.

In another embodiment, at step 1004, a plurality (W) of hair styles and colors is generated, representing a variety of hair styles and colors a subject might have. Such hair styles may include hair of various lengths, hair of various levels of straightness or curliness, various haircuts, and hairlines at various stages of baldness. Such hair colors may include those naturally present in human subjects (e.g. white, blond, red, brown, black), as well as colors generated by other means, such as dyeing (e.g. pink, blue, green, violet). At step 1006, the plurality (W) of hair styles and colors generated in step 1004 is added to the 3D body model 1002 to generate a plurality (W) of augmented 3D human body models that include various hair styles and colors at step 1008.

In another embodiment, at step 1004, a plurality (X) of virtual clothing is generated, representing a variety of fits of potential clothing a subject might wear, including but not limited to tight fit, regular fit, loose fit, etc. At step 1006, the plurality (X) of virtual clothing generated in step 1004 is added to the 3D body model 1002 to generate a plurality (X) of augmented 3D human body models that include various virtual clothing at step 1008.

In another embodiment, at step 1004, a plurality (Y) of lighting is generated, representing a variety of positions, angles, colors, and shadowing a subject might be under, including but not limited to natural sun light, room light, moonlight, camera flash light, street lights, etc. At step 1006, the plurality (Y) of lighting generated in step 1004 is added to the 3D body model 1002 to generate a plurality (X) of augmented 3D human body models that include various lighting at step 1008.

In some embodiments, the augmentation of skin colors, face contours, hair styles, and lighting is performed using image inpainting techniques. For example, a PyTorch implementation of a partial convolution layer is described at https://github.com/NVIDIA/partialconv. In some embodiments, skin color augmentation may be performed by adjusting the face rendering RGB curve based on skin color statistics. The statistics may follow various distributions, including, for example, a uniform distribution or a Gaussian distribution.

By combining the $2*P_1*Q$ images (where $P_1$ is either U, V, W, X, or Y) from step 1016 with the 1D measurements ("ground truth data") from step 1018, it is possible to generate a plurality ($2*P_1*Q$) of training data for training the deep learning networks from just one 3D body model, as shown in step 1020. Finally, in step 1022, the training data set is ready for use in training deep learning networks.

Figure 11:
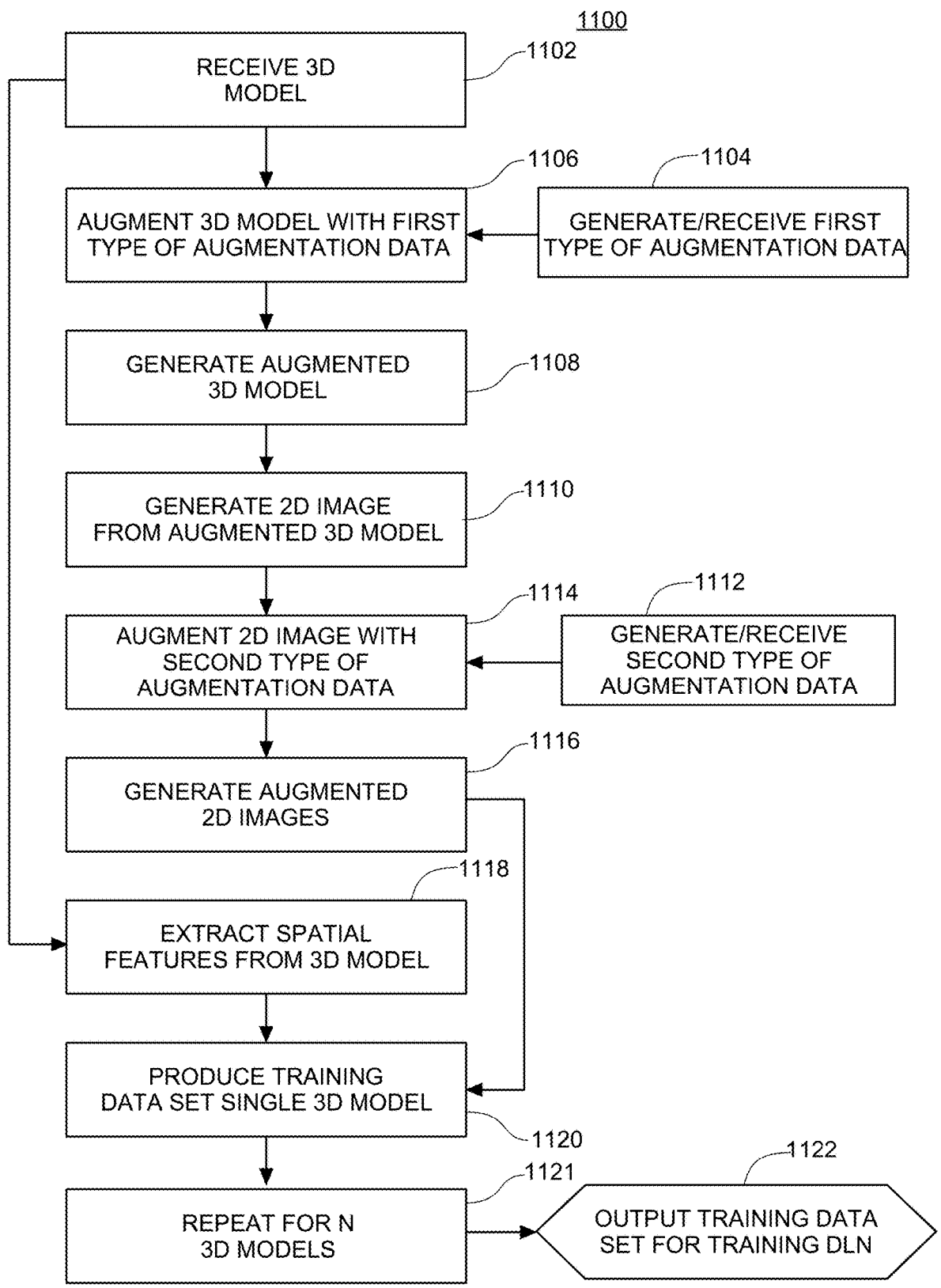
FIG. 11 shows an example flow diagram for generating massive data sets for training deep learning networks for spatial feature determination for multiple 3D models, in accordance with one embodiment.

FIG. 11 shows an example flow diagram 1100 for generating massive data sets for training deep learning networks for spatial feature determination for multiple 3D models, in accordance with one embodiment of the invention. Flow diagram 1100 represents a repetition, or loop, of flow diagram 900 in FIG. 9 for a plurality (N) of 3D models. At step 1121, the production of a training data set for a single 3D model as completed in step 1120 is repeated a plurality of times (N times) for a plurality (N) of 3D models. This results in $P_1*Q*N$ ($2*P_1*Q*N$ if two images are generated from each augmented 3D model) training data from just N 3D models, as shown in output element 1122. The training data 1122 may then be used in training the deep learning networks as described below.

Figure 12:
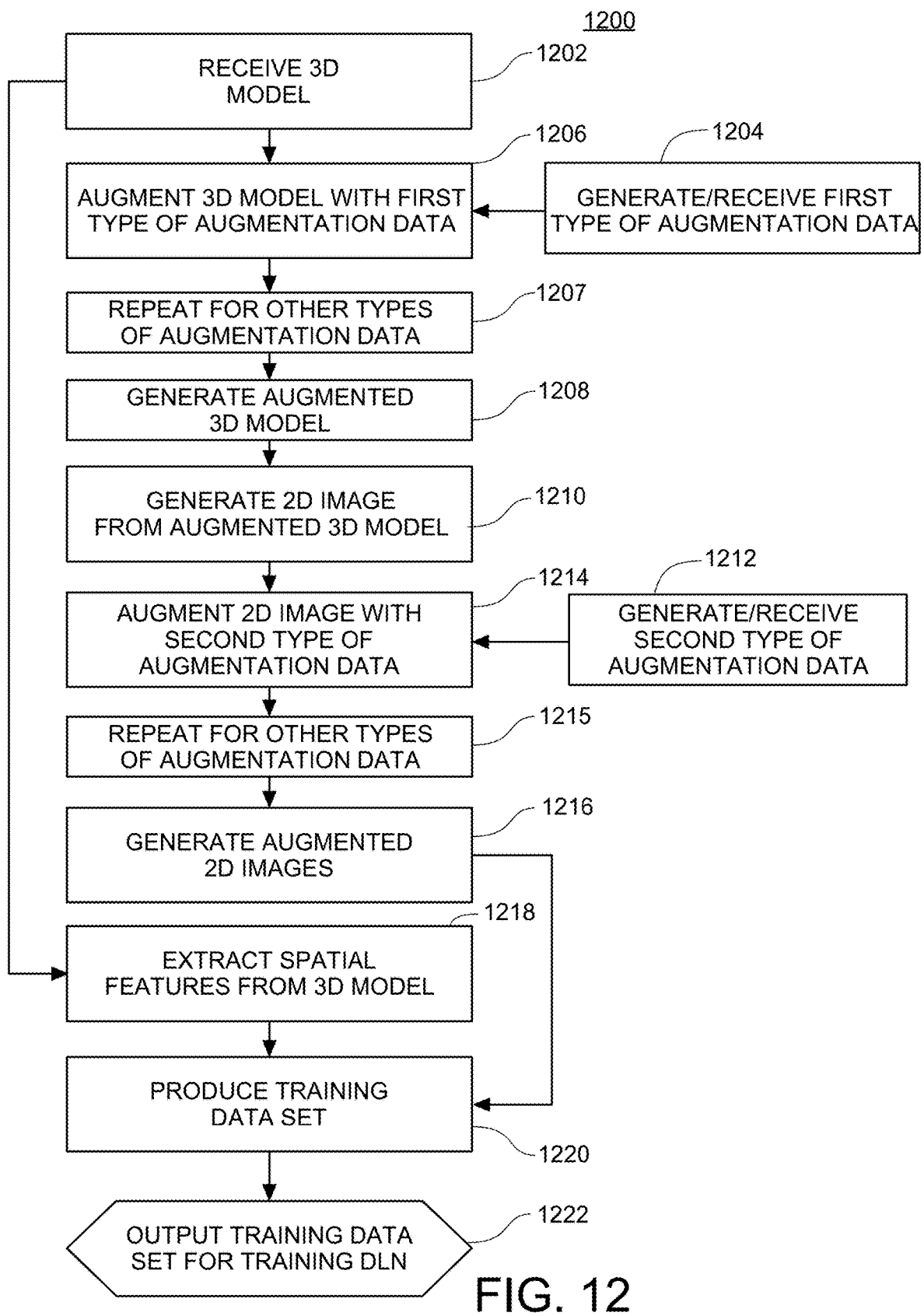
FIG. 12 shows an example flow diagram for generating massive data sets for training deep learning networks for spatial feature determination for a 3D model by augmenting the 3D model with multiple types of augmentation data, in accordance with one embodiment.

FIG. 12 shows an example flow diagram 1200 for generating massive data sets for training deep learning networks for spatial feature determination for a 3D model by augmenting the 3D model with multiple types of augmentation data, in accordance with one embodiment of the invention. Flow diagram 1200 is similar to flow diagram 900 in FIG. 9, but with augmentation steps repeated, or looped, as discussed below. At step 1204, a first type of augmentation data, comprising a plurality ($P_1$) of options, is generated. At step 1206, the 3D model 1202 is augmented with each option to generate a plurality ($P_1$) of a first stage of augmented 3D models 811-814. At step 1207, steps 1204 & 1206 are repeated for another type of augmentation data, comprising a plurality ($P_2$) of options, and the plurality ($P_1$) of first stage augmented 3D models 811-814 are again augmented with each option in the plurality ($P_2$) of options to generate a plurality ($P_1*P_2$) of a second stage of augmented 3D models 821-826 at step 1208. Step 1207 may be repeated any finite number of times (M) to generate a plurality ($P_1*P_2*P_3* \ldots *P_M$) of augmented 3D models. For example, executing steps 1204-1207 on a 3D human body model with a plurality (U) of skin colors, a plurality (V) of face contours, a plurality (W) of hair styles, a plurality (X) of types of virtual clothing, and a plurality (Y) of lighting conditions (M=5) generates a plurality ($U*V*W*X*Y$) of augmented 3D body models with various combinations of those features.

At step 1214, a second type of augmentation data, comprising a plurality ($Q_1$) of options, is generated, and the plurality ($P_1*P_2*P_3* \ldots *P_M$) of 2D images 831-832 are augmented with each option in the plurality ($Q_1$) of options to generate a plurality ($P_1*P_2*P_3* \ldots *P_M*Q_1$) of augmented 2D images 841-844. At step 1215, steps 1212 & 1214 are repeated for another type of augmentation data, comprising a plurality ($Q_2$) of options, and the plurality ($Q_1$) of first stage augmented 2D images are again augmented with each option in the plurality ($Q_2$) of options to generate a plurality ($Q_1*Q_2$) of augmented 2D images at step 1216. Step 1215 may be repeated any finite number of times (L) to generate a plurality ($P_1*P_2*P_3* \ldots *P_M*Q_1*Q_2*Q_3* \ldots *Q_L$) of augmented 2D images. For example, executing steps 1212-1215 on a plurality ($P_1*P_2*P_3* \ldots *P_M$) of 2D images with a plurality ($Q_1$) of background images, a plurality ($Q_2$) of noise conditions, and a plurality ($Q_3$) of perspective distortion data conditions (L=3) generates a plurality ($P_1*P_2*P_3* \ldots *P_M*Q_1*Q_2*Q_3$) of augmented 2D images with various combinations of those features.

Note that the processes disclosed in FIGS. 9-12 may be combined, and all such combinations are within the scope of the present invention. In one embodiment, not shown in FIGS. 9-12, one or more user parameters associated with each subject corresponding to each 3D model may be received. For 3D human body models, the one or more user parameters may comprise a height, a weight, a gender, an age, and/or additional demographic information associated with each subject of each 3D human body model, and any subsets thereof. For example, in one embodiment, the user parameter is the height of the user; while in another embodiment, the user parameters are the height and the weight of the user. In one embodiment, these user parameters may be used to train the sizing machine learning module on these additional use parameters associated with each subject. In one embodiment, the sizing machine-learning module is trained on ground truth data comprising the 1D body measurements extracted from the 3D human body model and one or more user parameters associated with the 3D human body model.

Illustrative Generation of Training Data for Deep Learning Networks

Figure 13A:
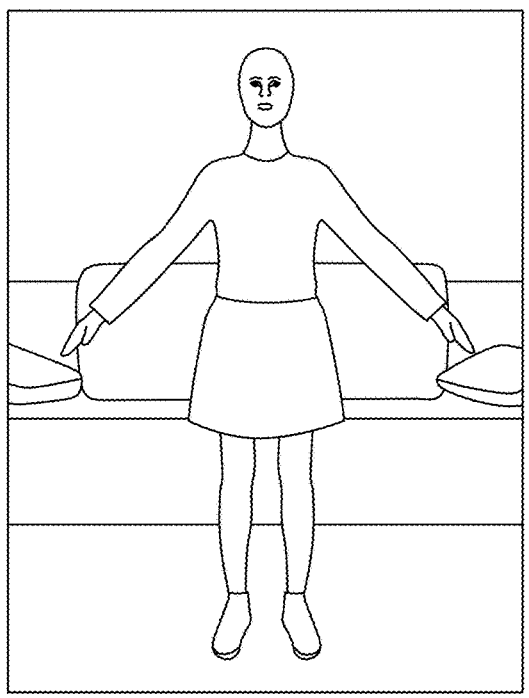
FIGS. 13A and 13B show example input images (front and side views, respectively) of an illustrative 3D model of a human for generating a training data set for training deep learning networks for measurement determination.
Figure 13B:
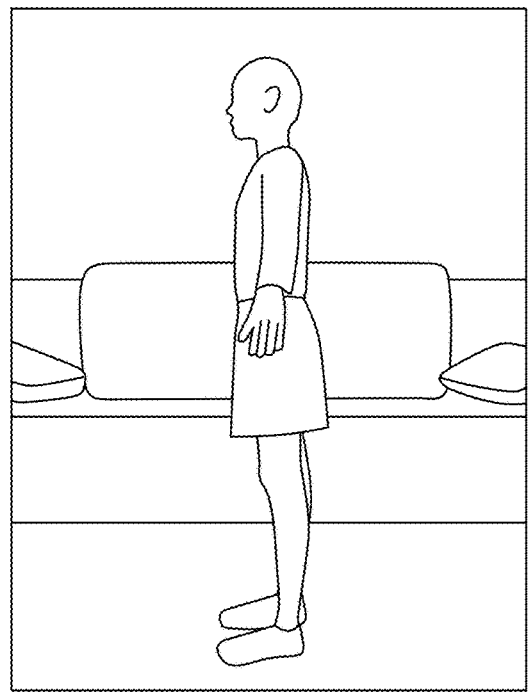
Figure 14:
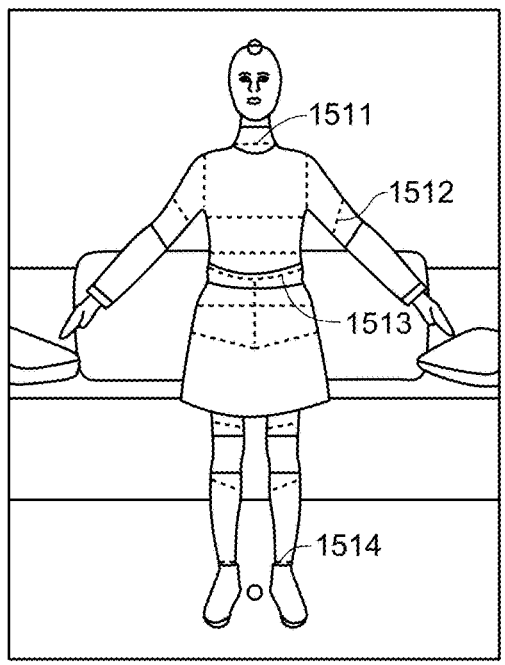
FIGS. 14 and 15 show example segmented and annotated images for an illustrative process for segmenting and annotating front view and side images, respectively, which may be performed manually by a human operator or automatically using the underlying 3D model, for training deep learning networks for measurement determination.
Figure 15:
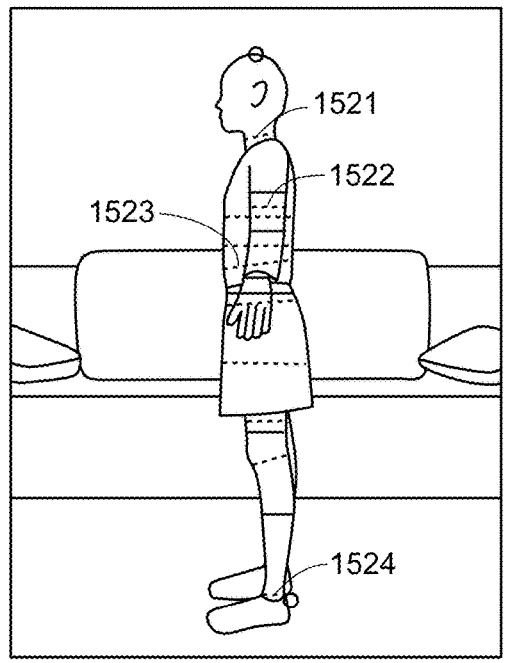

In order to understand the benefits of the present invention, it is useful to compare the processes described in FIGS. 9-12 for generating training data sets to a typical process used to generate segmented and annotated front and side images for training the deep learning networks. In that regard, FIGS. 13A & 14 show an illustrative annotation process for annotating a front view photo of a subject for training deep learning networks for body measurement determination, while FIGS. 13B & 15 show an illustrative annotation process for annotating a side view photo of a subject for training deep learning networks for body measurement determination, where FIGS. 13A & 13B are the input images for the process (before annotation) and FIGS. 14 & 15 are the output images for the process (after annotation). Although a specific user pose, the "A-pose," is shown in FIGS. 13A, 13B, 14 & 15, it will be understood to one of ordinary art that any pose, such as the A-pose, hands on the side, or any other pose is within the scope of the present invention. An optimal pose would clearly show legs and arms separated from the body. One advantage of the present invention is that a human can stand in almost any reasonable pose, against any type of background. The human does not need to stand against a blank background or make special arrangements for where the photos are taken.

FIGS. 13A, 13B, 14 & 15 show illustrative diagrams 1310, 1320, 1510 & 1520 of an annotator, or operator, manually segmenting one or more features of the human body under the clothing from the background for training the segmentation DLN. In FIGS. 13A, 13B, 14 & 15 the annotator is manually annotating the body under the clothing. Humans have lots of experience of seeing other humans and estimating their body shapes under the clothing, and this data is used for training the segmentation DLN to perform a similar operation automatically on new photos of unknown humans.

FIGS. 14 & 15 show illustrative diagrams of the body features of the human body segmented from the background after all body features have been successfully annotated by the annotator. In the illustrative diagrams 1510 & 1520, dashed lines represent the segmentation of body parts, and solid lines represent annotation lines for body part measurements. In other embodiments, other distinctive markings may be used to denote the two types of segmentations and annotations. The annotation has identified, for example, the bottom of the neck or top of the torso 1511 & 1521, the bottom of the upper arm 1512 & 1522, the waist 1513 & 1523, and the top of the ankle 1514 & 1524.

Furthermore, the height of the user may be annotated as well. In illustrative diagrams 1510 & 1520, the top and bottom of the user are marked by small circles just above the user's head and between the user's feet, respectively. This height information may be used, for example, for correctly scaling the 2D image for scaling the other measurements from pixels to real-world units (e.g., cm). This data is used to train the human segmentation DLN.

The processes described in relation to FIGS. 9-12 can be used to automate the highly tedious process of manually generating segmentation and annotation data as described in FIGS. 14 & 15. Instead of the human annotator having to manually segment the body under the clothing from the background, and manually add annotation lines corresponding to the measurement lines, the processes of FIGS. 9-12 can be used to automatically generate segmentation and annotation data from the 3D model. The 3D model already contains the data corresponding to the outline of the human under the virtual clothing, as well as the data corresponding to the annotations of the measurement lines. This data is implicitly stored in the 3D model and can be extracted from the 3D model and used to generate massive amounts of training data as described in relation to FIGS. 9-12 above.

In addition, because the corresponding 1D measurements have also been extracted from the 3D model, this data can also be used as "ground truth" data corresponding to actual human body measurements, which can be used to train the sizing machine learning module described below as well.

Therefore, using the principles taught in the present disclosure, it is possible to avoid both manual segmentation of the body under the clothing, as well as avoid manual annotation of the measurement lines on the body. Furthermore, the present invention obviates the need to obtain "ground truth" data from actual human tailors. Together, the present invention saves much labor and many manual steps are eliminated from the process of collecting and generating useful training data sets for training the deep learning networks. In addition, the principles taught in the present disclosure enable the vast magnification, or increase, in the quantity of training data. From just a relatively small set of 3D models, vast amounts of useful training data may be quickly and efficiently generated, without the need for front and side photographs or actual tailors to measure sample subjects.

Although only front and side views are shown in FIGS. 13A, 13B, 14 & 15, one of ordinary skill in the art would recognize that any other orientations of views, including 45-degree views, top views, and so on, are within the scope of the present invention, depending on the type of body measurement desired. For example, a top photo of the top of a human head would be optimal for head measurements used to manufacture custom hats. Similarly, a front face only photo would be optimal for facial measurements used for sizing glasses, optical instruments, and so forth. A close-up photo of the front and back of a human hand can be used for sizing custom gloves, custom PPE (personal protective equipment) for the hands, custom nails, and so forth.

Training the Deep Learning Networks from Generated Data Sets

Training data from 3D models taken from a variety of sources in order to train the deep learning networks generated as described in this disclosure would greatly advance the state of the art in deep learning network training. The following section describes how the generated datasets are used to train the deep learning networks after the massive training data sets have been generated as described above.

Figure 16:
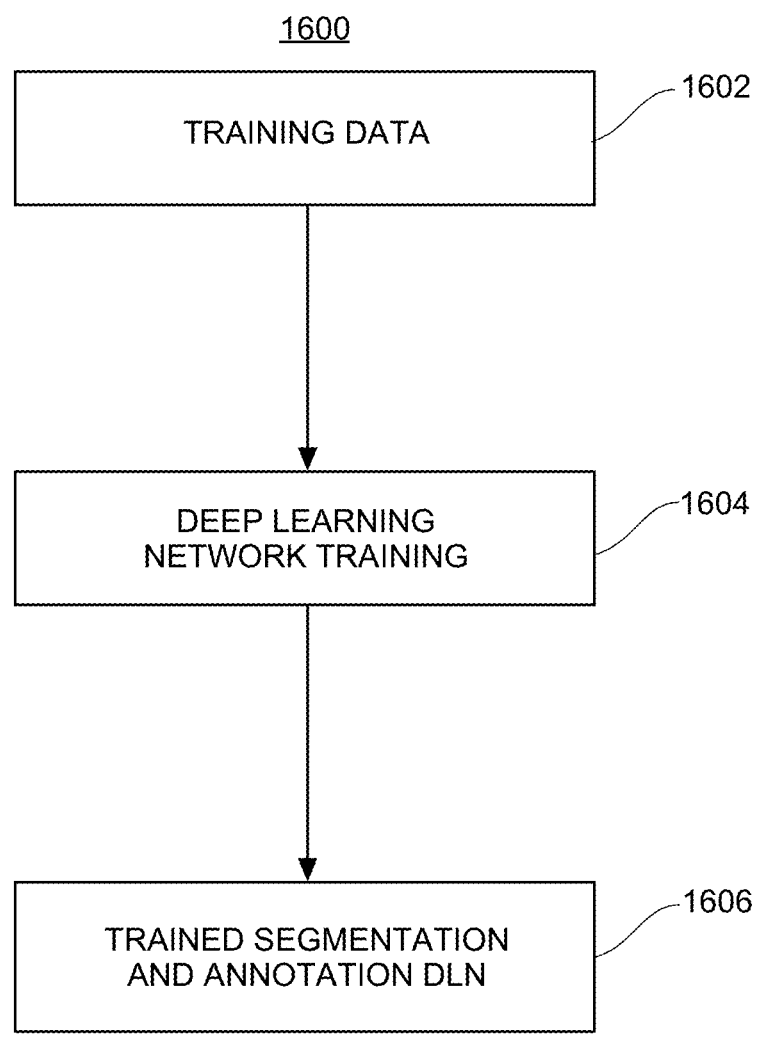
FIG. 16 shows an example flow diagram for training deep learning networks for measurement determination, in accordance with one embodiment.

FIG. 16 shows an example flow diagram 1600 for training deep learning networks for measurement determination, in accordance with one embodiment of the invention. Consider the generalized case for a plurality (N) of 3D models, a plurality (M) of categories of the first type of augmentation, a plurality (L) of categories of the second type of augmentation, and two images (front and side) are taken for each augmented 3D model. At step 1602, the plurality $(2*P_1*P_2*P_3* \ldots *P_M*Q_1*Q_2*Q_3*Q_3* \ldots *Q_L*N)$ of training data is generated. At step 1604, the plurality $(2*P_1*P_2*P_3* \ldots *P_M*Q_1*Q_2*Q_3* \ldots *Q_L*N)$ of training data is used to train the deep learning networks for both segmentation and annotation, as well as to train the machine learning module for measurement extraction as described in greater detail below. Finally, at step 1606, the trained segmentation DLN, annotation DLN, and machine learning modules are output and utilized for body measurement determination as described in greater detail below.

In short, as a result of utilizing the processes described above, a large increase in training data $(2*P_1*P_2*P_3* \ldots *P_M*Q_1*Q_2*Q_3* \ldots *Q_L*N)$ is generated from just a small number (N) of 3D models. For even modest $P_1$, $P_2$, $P_3$, ..., $P_M$, $Q_1$, $Q_2$, $Q_3$ ..., $Q_L$, and N, a very large training data set may be generated from a small number (N) of 3D models. For example, generating just 2 ($P_1$) different skin colors, 2 ($P_2$) different face contours, 2 ($P_3$) different hair styles, 10 ($P_4$) different types of virtual clothing, 2($P_5$) different lighting conditions, 2 images for each augmented 3D model (front and side), 100 ($Q_1$) different backgrounds, and 2 ($Q_2$) different noise profiles, using the principles taught herein, it is possible to generate 640,000,000 training data points from just 10,000 3D models $(2*2*2*2*10*2*100*2*10,000)$, which is a factor of 64,000, or about 4.5 orders of magnitude increase in the size of the training data set.

Figure 17:
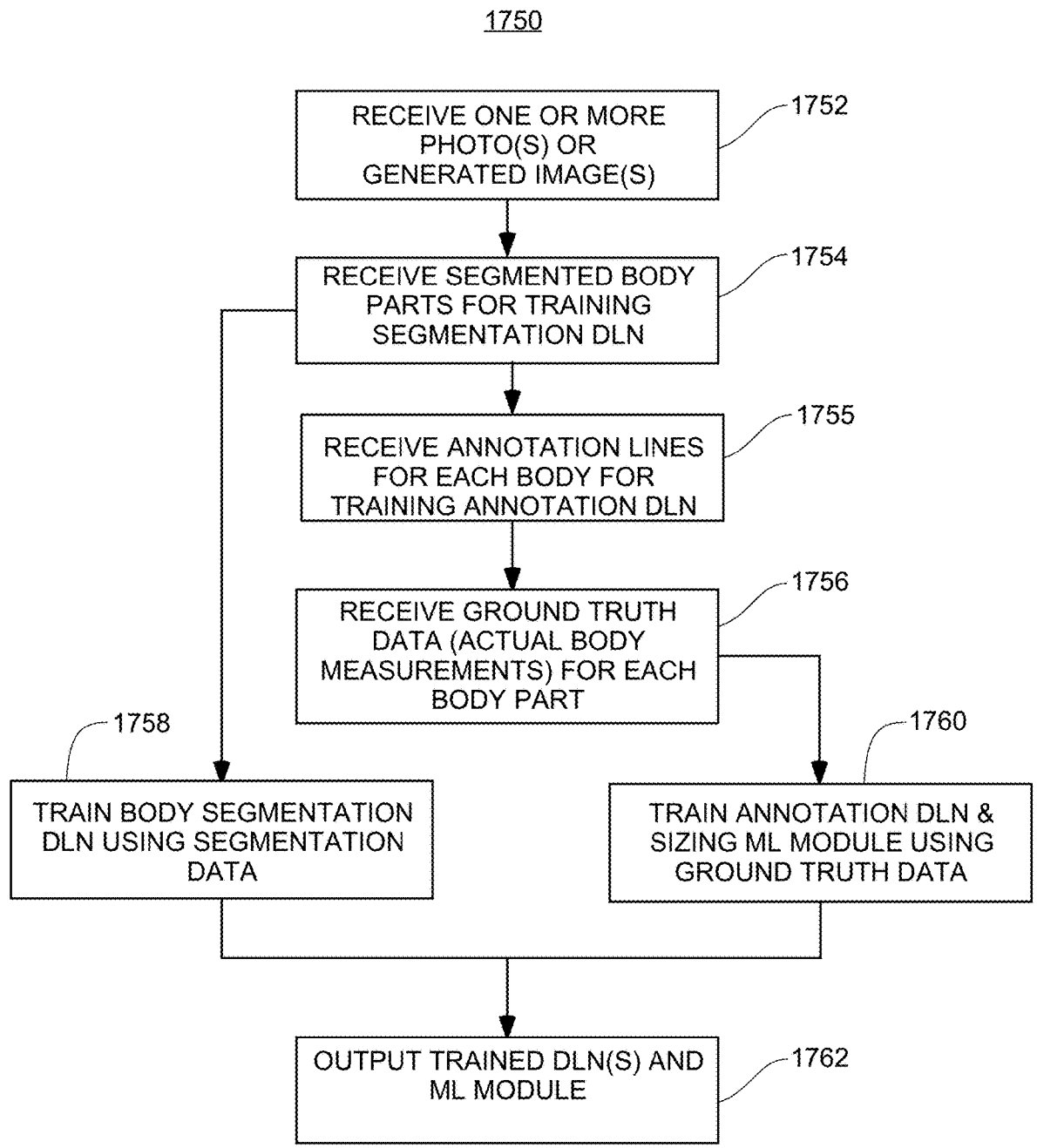
FIG. 17 shows another detailed example flow diagram for training deep learning networks for body measurement determination, in accordance with one embodiment.

FIG. 17 shows another detailed example flow diagram 1750 for training deep learning networks for body measurement determination, including training the segmentation DLN, the annotation DLN, and the sizing ML, in accordance with one embodiment of the invention. At step 1752, one or more photos or generated augmented 2D images are received. In one embodiment, and as described above, the front and side view augmented 2D images are generated from a 3D model, and the system utilizes the generated or "virtual" front and side view images throughout the rest of the process described in FIG. 17.

At step 1754, segmented body parts are received for training the segmentation DLN. In one embodiment, as described above, the front and side view images are segmented using data from a 3D model, and the system utilizes the generated or "virtual" segmented images throughout the rest of the process described in FIG. 17. In another embodiment, an annotator may manually segment body features, such as body parts, under the clothing using human intuition.

At step 1755, annotation lines for each body part are received for training the annotation DLN. In one embodiment, as described above, the front and side view images are annotated using data from a 3D model, and the system utilizes the generated or "virtual" annotated front and side view images throughout the rest of the process described in FIG. 17. In another embodiment, a human annotator may draw estimated annotation (measurement) lines for each body feature under the clothing using human intuition.

At step 1756, real-world measurements for each body feature may be received to serve as ground-truth data. In one embodiment, the real-world measurements are determined from 1D measurements taken from the 3D body models, as described above. In another embodiment, the real-world measurements are determined from measurements collected by a human tailor. The real-world measurements may be used as "ground truth" data and used for training the machine learning module used by the system. For example, the real-world measurements may be used in minimizing an error function or loss function (mean squared error, likelihood loss, log-loss, hinge loss, etc.) associated with the machine learning module described below.

At step 1758, the segmentation DLN may be trained on a body segmentation or body feature extraction. In one embodiment, the segmentation DLN may be trained using human body segmentation obtained in step 1754. For example, the segmentation DLN may be presented with labeled data (e.g., an image of a user and associated actual body segmentations) and may determine an error function (e.g., from a loss function, as discussed above) based on the results of the segmentation DLN and the actual body segmentation. The segmentation DLN may be trained to reduce the magnitude of the error function.

At step 1760, one or more annotation DLNs for each body feature may be trained, or alternatively a single annotation DLN for the entire body may be trained. For example, sixteen annotation DLNs, one for each of 16 different body parts, may be trained. In one embodiment, the annotation DLN may be trained using the annotations obtained in step 1756. For example, the annotation DLN may be presented with labeled data (e.g., an image of a user with line annotations) and may determine an error function (e.g., from a loss function, as discussed above) based on the results of the annotation DLN and the actual annotations. The annotation DLN may be trained to reduce the magnitude of the error function.

Optionally, at step 1760, one or more sizing ML modules for each body feature may be trained, or alternatively a single sizing ML module for the entire body may be trained. In one embodiment, the sizing ML module may be trained using the measurements obtained in step 1756. For example, the sizing ML module may be presented with labeled data (e.g., an annotation line length and associated actual measurement data) and may determine an error function (e.g., from a loss function, as discussed above) based on the results of the sizing ML module and the actual measurements. The sizing ML module may be trained to reduce the magnitude of the error function.

At step 1762, the trained segmentation DLN, annotation DLN, and, optionally, sizing ML module may be output for use in body measurement determination. In particular, the segmentation DLN trained in step 1758 is output for use in body feature segmentation. Similarly, the one or more annotation DLNs trained in step 1760 are output for body feature annotation. Finally, optionally, the sizing ML module trained in step 1760 is output for body feature measurement determination.

Evaluation of the Trained Deep Learning Network

FIGS. 18A and 18B show an illustrative test run on sample 2D images (front view and side views, respectively) of a sample 3D model utilizing a deep learning network (DLN) for body measurement determination after the DLN has been trained. As discussed above, FIGS. 13A & 13B are the input images for an illustrative annotation process for annotating a front view photo and a side view photo of a subject for training deep learning networks for body measurement determination. Consider the same FIGS. 13A & 13B as the input images for an illustrative test run on sample 2D images for body measurement determination. As discussed above, although a specific user pose, the "A-pose," is shown in FIGS. 13A, 13B, 18A & 18B, it will be understood to one of ordinary art that any pose, such as the A-pose, hands on the side, or any other pose is within the scope of the present invention. An optimal pose would clearly show legs and arms separated from the body.

After the test run has completed, the DLN outputs illustrative diagrams 1830 & 1840 that show front and side sides, respectively, of the sample 3D model with annotation marks associated with body measurement determination. In illustrative diagrams 1830 & 1840, several such annotation marks are shown, such as the width of the neck 1831 & 1841, the edge of the arm 1832 & 1842, the edge of the wrist 1833 & 1843, the edge of the torso 1834 & 1844, the top of the inseam 1835 & 1845, and the top of the ankle 1836 & 1846, all determined underneath the clothing.

The height of the user is annotated as well. In illustrative diagrams 1830 & 1840, the top and bottom of the user are marked by small circles just above the user's head and between the user's feet, respectively. This height information may be used, for example, for correctly scaling the 2D image for scaling the other measurements from pixels to real-world units (e.g., cm).

FIG. 18C shows results of an illustrative test run on the sample 2D images from FIGS. 18A and 18B. The results are displayed as an exemplary table 1850, where a first column indicates identified body parts on the 3D model and a second column indicates sizing results determined for those body parts. The body parts may include, for example, the neck (circumference), shoulder (width), sleeve (length), wrist (circumference), and waist (circumference). In exemplary table 1850, the body part "neck" in cell 1851 is shown in cell 1852 to be of size "33.2227 [cm]." The body parts may also include measurements for clothing inferred from physical body parts, such as the pants outseam and inseam appropriate for a particular 3D model. In some embodiments, the sizing results represent the best point estimate that reduces the mean square error (MSE estimate). In some embodiments, the test run may also include confidence intervals for the sizing results (not shown). In test runs of the present invention, less than 1 cm (<1 cm) accuracy has been achieved.

Illustrative First Types of Augmentation Data

To summarize, why do we need first type of augmentation data (e.g., face augmentation)? In typical datasets, for example, typical 3D body data sets generated from 3D body models, each rendered image has many body shapes because many 3D body shape models are available. However, there are only a few face patterns, typically two or three depending on the given base-mesh. A given base-mesh is a unified mesh for wrapping 3D scanned body data. Therefore, in the virtual deep learning dataset generation, we need skin, face, hair and other first types of augmentations. These are discussed in turn.

Skin Augmentation

For skin augmentation, various implementations are possible according to the present invention. In one embodiment, the current generation system has skin color augmentation. Skin augmentation is implemented in one embodiment with a skin augmentation shader code, as described in greater detail below. A shader is a shading program for 3D graphics programs, and the shader has a random RGB curve which can be used to change the skin color from black to white, as well as the colors in between. The skin augmentation is done programmatically during the rendering of the 3D model. In one embodiment, the script changes the shader's RGB curve based on skin color statistics, for example, using a uniform, Gaussian, or other distribution.

Figure 19:
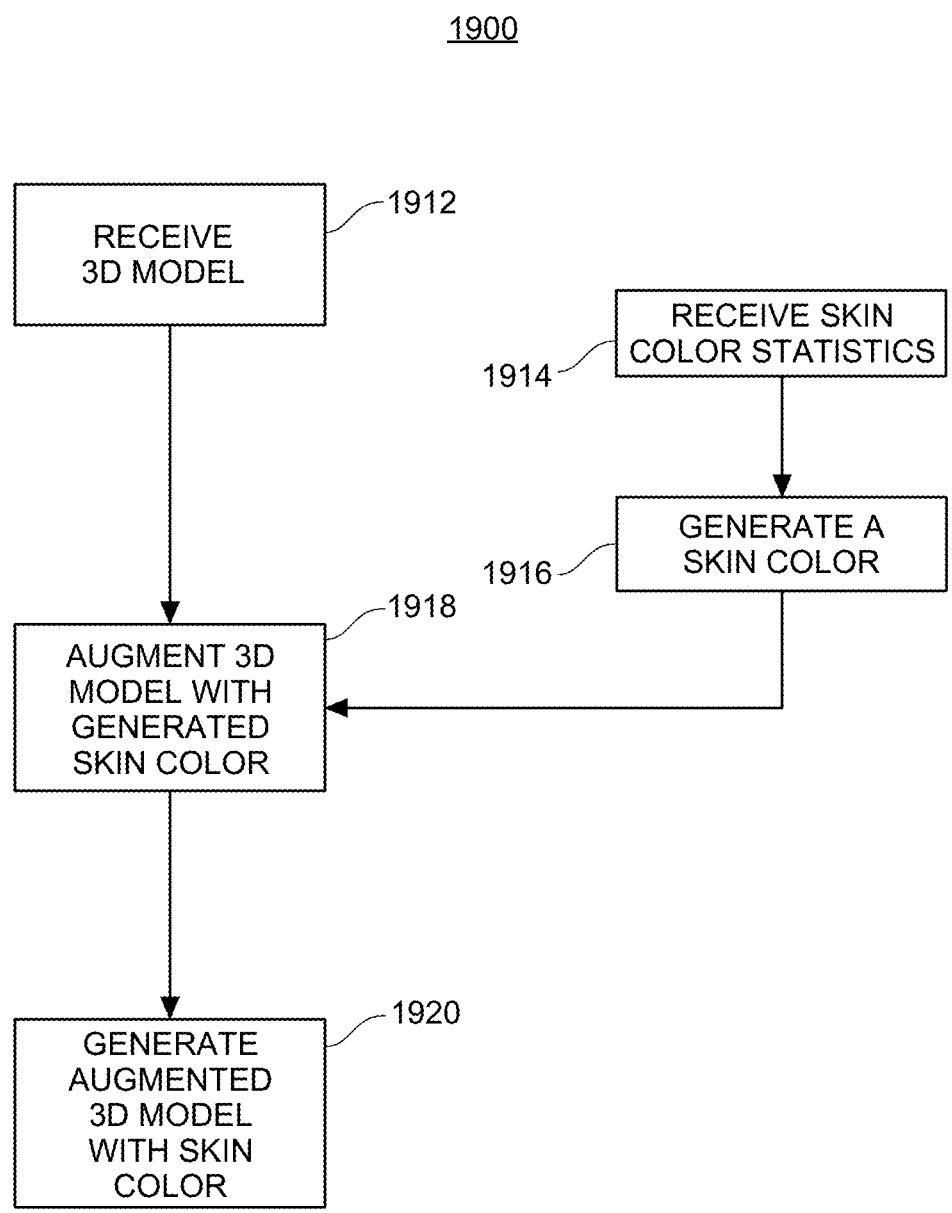
FIG. 19 shows an illustrative process for generating a first type of augmentation data comprising a skin tone, in accordance with one embodiment.

FIG. 19 shows an illustrative process 1910 for generating a first type of augmentation data comprising a skin tone. First, in step 1912, a 3D model is received. In step 1914, skin color statistics are received. Skin color statistics includes information such as the range of skin colors (rendered as red-green-blue or RGB numbers), the quantization of colors in the range, and the relative probabilities of individual humans having each skin color in the range as quantized by the quantization. In some embodiments, these skin color statistics correspond to the entire human worldwide population. In other embodiments, these skin color statistics correspond to the human population for a particular country, region or ethnic group. In other embodiments, these skin color statistics take into account tanning, tattooing, or other natural or artificial alterations to human skin color. In step 1916, a skin color is generated from the skin color statistics by choosing a random skin color within the color range in accordance with the associated probabilities. In step 1918, the 3D model received in step 1912 is augmented with the generated skin color to generate an augmented 3D model with skin color in step 1920.

Face Augmentation

In one embodiment, face augmentation may be implemented using a partial convolution deep learning network, by 1) firstly, rendering an eye, nose, and mouth-masked image, and 2) secondly, applying a partial convolution deep learning network to the masked image and obtaining a face augmented image. Accordingly, it is possible to obtain a large number of realistic rendered humans with realistic faces from a limited number of 3D body models containing only a few face variations.

Figure 20:
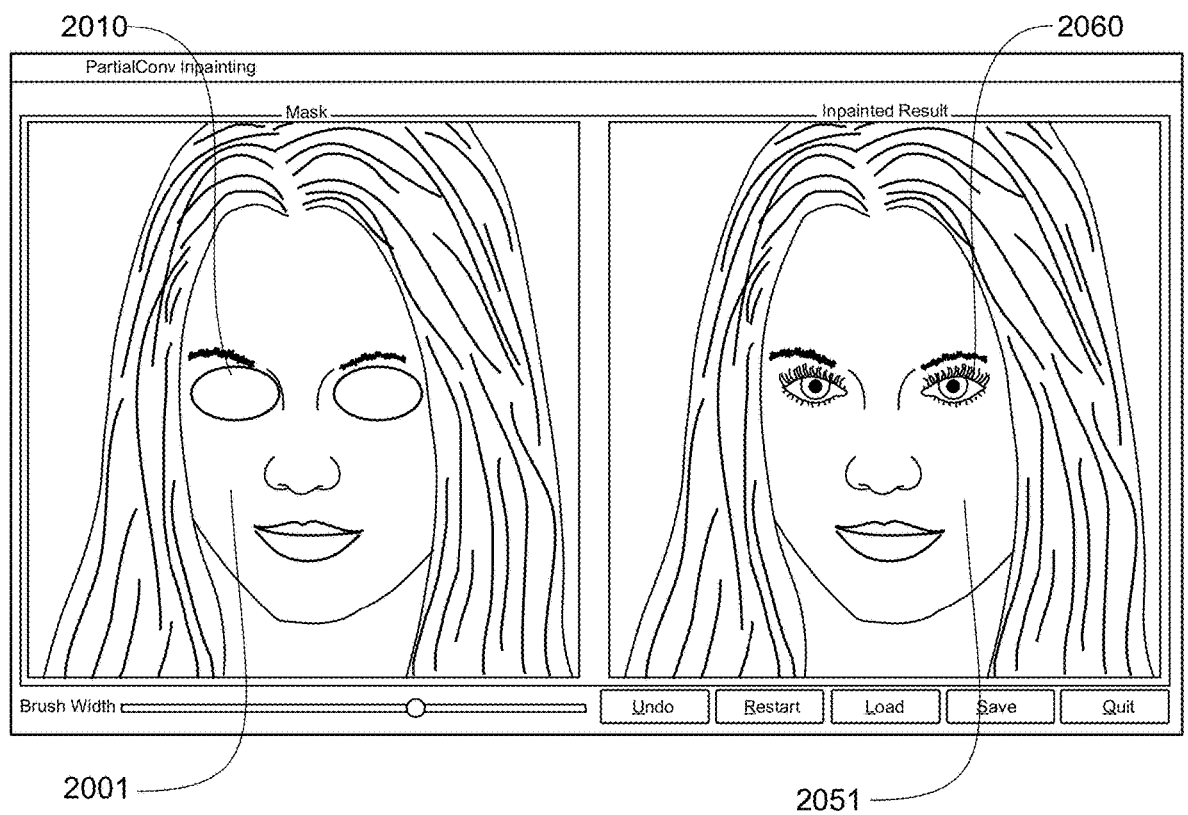
FIG. 20 shows an illustrative process for generating a first type of augmentation data comprising a face augmentation, in accordance with one embodiment.

FIG. 20 shows an illustrative process 2000 for generating a first type of augmentation data comprising a face augmentation. In particular, the face augmentation may comprise face contours a subject might have, for example, the shapes of the eyes, nose, cheeks, chin, jawline, mouth, and forehead. The face contours are also independent of the body shape of any 3D body model. In process 2000, an input face mask 2001 is selected, and the feature to be augmented is selected, such as the eyes 2010. An output face 2051 is generated comprising the augmented face with the selected feature added, such as eyes 2060.

Figure 21:
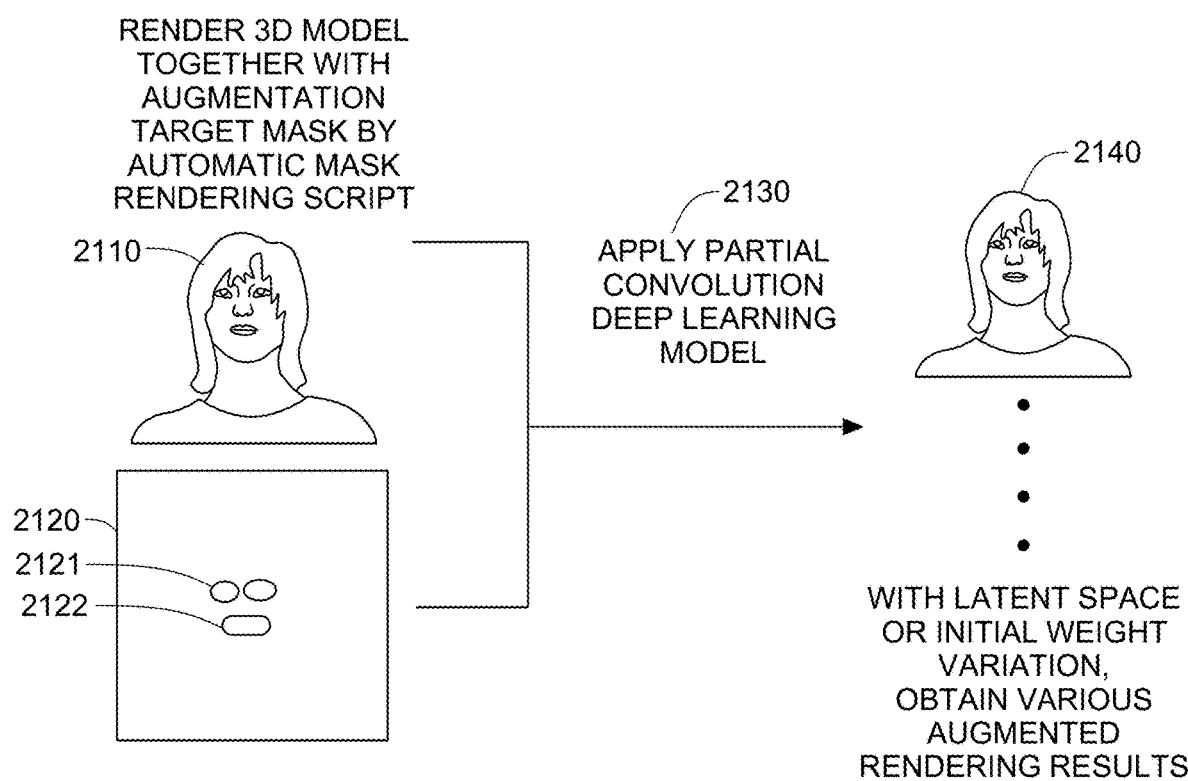
FIG. 21 shows a flow chart of the process for generating the first type of augmentation data comprising the face augmentation, in accordance with one embodiment.

FIG. 21 shows a flowchart for a process 2100 for generating the first type of augmentation data comprising the face augmentation. In step 2110, a 3D human body model is received. In step 2120, a face mask with features, such as eyes 2121 and mouth 2122, is received. In step 2130, a partial convolution deep learning model is applied to combine the face mask with the 3D human body model. In some embodiments, the partial convolution deep learning model is implemented as described by Guilin Liu, et al., "Image Inpainting for Irregular Holes Using Partial Convolutions," Available at https://arxiv.org/abs/1804.07723, and at https://github.com/NVIDIA/partialconv, the entire disclosures of which are hereby incorporated by reference as if fully set forth herein.

Hair Augmentation

Another category of first type augmentation data, which can be used either independently of the others or partially dependent, includes hair augmentation. Hair augmentation may comprise various hair styles, hair color, hair texture, and hair partially covering the face or body. In some embodiments, hair augmentation may be performed by an auto-hair algorithm. In some embodiments, the auto-hair algorithm is implemented as described by Menglei Chai, et al., "AutoHair: Fully Automatic Hair Modeling from A Single Image," Available at http://www.kunzhou.net/2016/autohair.pdf, the entire disclosure of which is hereby incorporated by reference as if fully set forth herein.

Light Augmentation

Light augmentation may include simulating various lighting conditions under which a 3D object is imaged or photographed. For example, the angle of light source would affect shadowing, the color of the light source would affect the colors of the subject and surrounding objects, and low lighting conditions would affect the accuracy of determining the edges of physical features. All of these lighting conditions may be cycled through and the first type of augmentation data generated, in order to generate additional realistic data sets for training deep learning networks, in a manner similar to the process employed above for skin color augmentation using the skin shader.

Virtual Clothing Augmentation

Other first types of augmentation data also include, but are not limited to, various virtual clothing, illustrating various clothing that an actual human might be wearing when the photographs may be taken, as discussed above.

Other categories of first type augmentation data are possible, either independently of one another or partially dependent. Other first types of augmentation data are also within the scope of the present invention, and the present invention is not limited to the illustrative first types of augmentation data shown or described herein.

Illustrative Second Types of Augmentation Data

Second types of augmentation data are added to the 2D image after projecting from the 3D base model. Various illustrative second types of augmentation data are discussed next.

Background Augmentation

As discussed above, in some embodiments, the second type of augmentation data may be, for example, a plurality (Q) of background images. The background images represent a variety of potential backgrounds that may be observed by subjects in real environments. The background images should be representative of various lighting, shading, locality, and other background conditions that are typical of subjects taking spatial features, such as body measurements. A variety of backgrounds should be selected to optimize the training of the deep learning networks, in particular the segmentation deep learning network as described above.

Noise Augmentation

In other embodiments, the second type of augmentation data may be, for example, white noise or other types of random noise. This may be useful in rendering the deep learning network more robust to imperfect image capturing and other environmental conditions. The noise may be generated by, for example, a random number generator in accordance with a selected probability distribution, such as a Gaussian or uniform distribution. In other embodiments, the noise may be generated from measurements of noise in real-life environments. For example, such noise may arise from dust on the camera lens, smoke or fog in the environment as the photo is taken, or extraneous light (e.g. sunlight reflected directly into the camera lens).

Perspective Distortion Augmentation

In other embodiments, the second type of augmentation data may be, for example, perspective distortion data. When a 2D image is taken of a 3D object or scene from a fixed point, there is a warping or transformation of the object or scene, which differs significantly from what the object would look like if the 2D image were taken from an infinite distance (i.e. 2D projection of a 3D object), due to the relative scale of nearby and distant features. The warping or transformation includes distorting the relative sizes of features based on distance from the fixed point and altering angles. Perspective distortion data comprises information that alter a 2D projection image to what it would be if the image were taken from a particular point. Thus, using perspective distortion data to generate a plurality of 2D images that simulate photographs taken from various focal points trains the DLN to correct for the warping and transformations that occur in real-life photography.

Other second types of augmentation data are also within the scope of the present invention, and the present invention is not limited to the illustrative second types of augmentation data shown or described herein.

Deep Learning Networks and Machine Learning for Body Measurements

Once the deep learning networks have been trained using the synthetized training data as described above, they can be used for accurate measurement determination from 2D photos taken in natural environments. For example, in one embodiment, the trained deep learning networks may be used for highly accurate body part measurements from 2D photos taken of human subjects under typical conditions. The process to utilize the trained deep learning networks for accurate measurement determination is described next.

Figure 22:
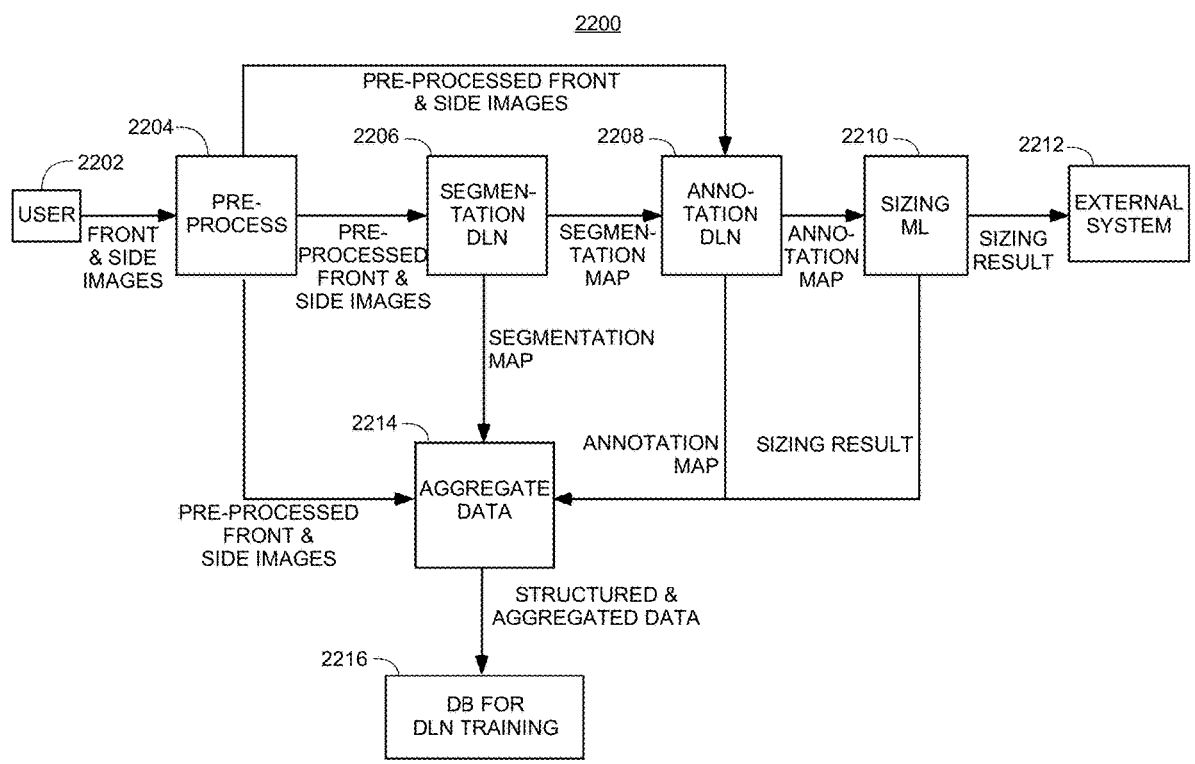
FIG. 22 shows an illustrative architecture for a deep learning network for body measurement determination, in accordance with one embodiment.

FIG. 22 shows an illustrative architecture 2200 for a deep learning network for body measurement determination (using separate segmentation DLN, annotation DLN, and sizing ML module), in accordance with one embodiment of the invention. In one embodiment, front and side images are received from a user at 2202.

The received front and side images are first pre-processed at 2204. In some embodiments, a pre-processing on the one or more images of the user, such as a perspective correction, may be performed on the front and side view photos, if needed. For example, the system may use OpenCV, an open-source machine vision library, and may make use of features of the head in the front and side view photos and the user's height as references for perspective correction. In this way, embodiments of the disclosure may avoid determining measurements which are inaccurate as far as the proportions of the lengths of the body go, such as torso length and leg length. Optionally, a perspective side photo showing where the camera is positioned relative to the person being photographed may yield even more accurate perspective correction by allowing the system to calculate the distance between the camera and the user. In some embodiments, the system may instead use gyroscope data provided by the user device (or a peripheral device connected to the user device, such as an attached computer device) to detect a photo perspective angle, and perform perspective correction based on this photo perspective angle.

Various computer vision techniques may be utilized to further pre-process the one or more images. Examples of additional pre-processing steps may include, but are not limited to, contrast correction, lighting correction, and other image processing techniques to improve the quality of the one or more images before further processing.

After pre-processing, the pre-processed images are sent to the segmentation DLN at 2206 to generate the segmentation map segmenting the human body parts from the background. The segmentation map is aggregated with the rest of the data at 2214. In parallel to the segmentation, in one embodiment, the pre-processed images are also sent to annotation DLN at 2208 to generate the annotation measurement lines. The annotation map is aggregated with the rest of the data at 2214. The annotation map is provided, in one embodiment, to sizing machine learning (ML) module 2210 to generate the body feature measurements for each body feature that has been segmented and annotated by measuring each annotation line. The sizing result is aggregated with the rest of the data at 2214. The sizing result is output to one or more external system(s) for various uses as described herein at 2212. Finally, all of the aggregated and structured data, (1) the pre-processed front and side images, (2) the segmentation map, (3) the annotation map, and (4) the sizing result, that have been aggregated at 2214 are stored in a database for further DLN training at 2216.

Figure 23:
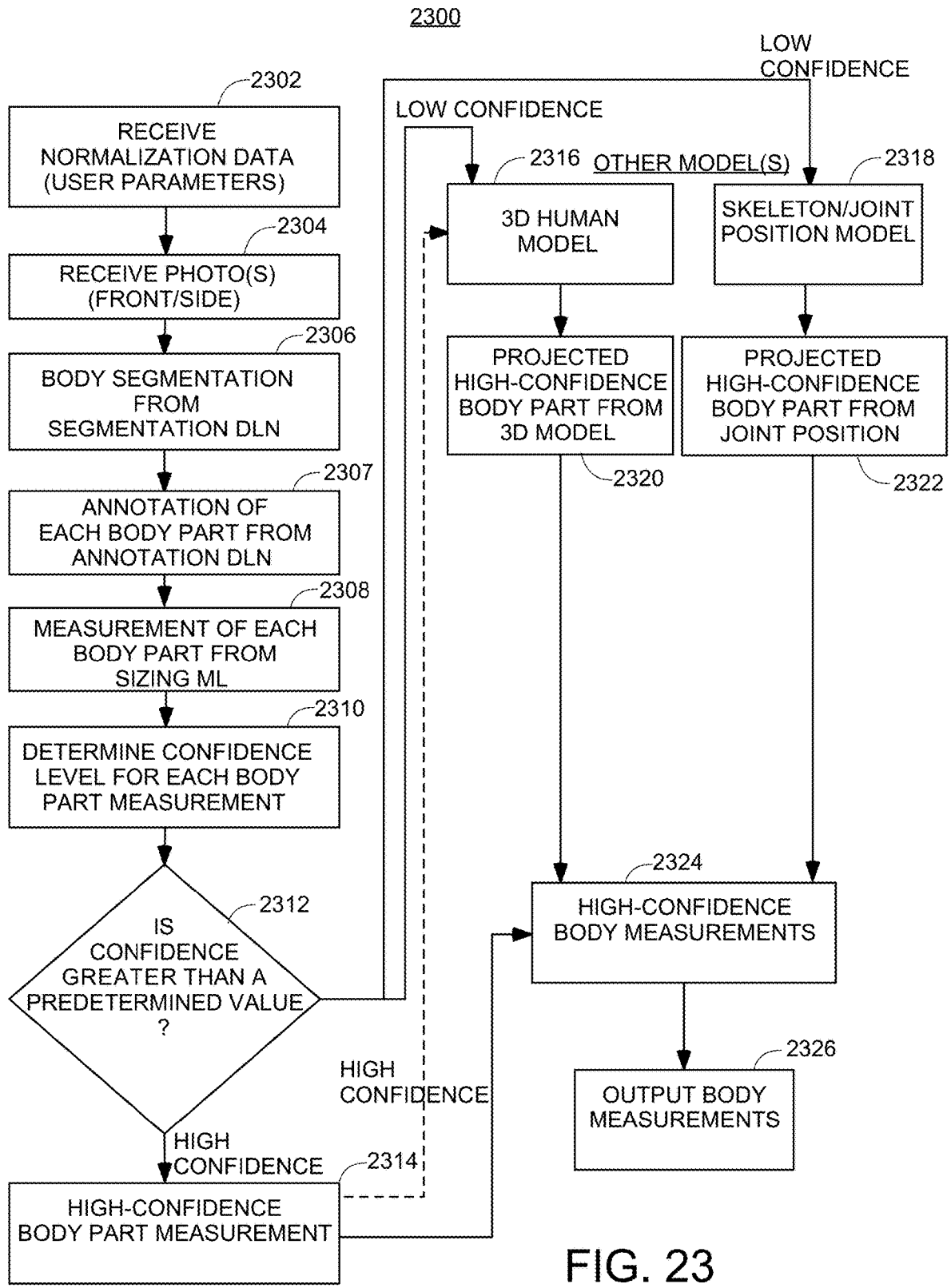
FIG. 23 shows an illustrative flow diagram for a deep learning network for body measurement determination, in accordance with one embodiment.

FIG. 23 shows a diagram of an example flow 2300 for body measurement determination operations, in accordance with example embodiments of the disclosure. In some embodiments of the prevent invention, computer vision techniques and deep learning are applied to one front view photo and one side view photo of the user, plus the user's height, and possibly other user parameters such as weight, sex, age, etc. and generate full body measurements using one or more deep learning networks that have been trained on segmented and annotated training data generated. As more data is collected by the system, the accuracy of the body measurements automatically improves. Optionally, and according to some other embodiments, perspective correction, human background subtraction, skeleton detection, and 3D model matching approaches, utilizing computer vision techniques, are used to improve on any low-confidence body measurements from the deep learning approach.

The overall process 2300 starts at step 2302, where normalization data (one or more user parameters), such as a height of the user, is obtained, generated, and/or measured in order to perform a normalization or a scaling. In another embodiment, a weight may also be used in conjunction with the height. Both user parameters may be determined automatically (e.g., using computer vision algorithms or mined from one or more databases), or determined from the user (e.g., user input). In one embodiment, from these user parameters, a body mass index (BMI) may be calculated. The BMI may be used to calibrate the body measurement extraction using both the body weight and height. Additional user parameters may include at least one of a height, a weight, a gender, an age, race, country of origin, athleticism, and/or other demographic information associated with the user, among others. The height of the user is used to normalize, or scale, front and/or side-view photos and provide a reference for a human in the photo. The other user parameters, such as the weight, BMI index, age, sex, and so forth, are used as additional inputs into the system to optimize the body sizing measurements. In one embodiment, the other user parameters may also be obtained automatically from the user device, from one or more third-party data sources, or from the server.

At step 2304, one or more user photos may be received; for example, at least one front and/or side view photos of a given user may be received. In another embodiment, the photos may be obtained from the user device (e.g., mobile phone, laptop, tablet, etc.). In another embodiment, the photos may be obtained from a database (e.g., a social media database). In another embodiment, the user photos include a photo showing a front view and a photo showing a side view of the entire body of the user. In some embodiments, only one photo, such as a front view, is utilized and the one photo is sufficient to perform accurate body measurement extraction. In yet other embodiments, three or more photos are utilized, including in some embodiments a front view photo, a side view photo, and a photo taken at a 45 degree angle. Other combinations of user photos are within the scope of the present invention, as would be recognized by one of ordinary skill in the art. In some embodiments, a user video, for example a front view, a 90, 180, or even 360 degree view of the user may be received. From the user video, one or more still frames or photos, such as a front view, a side view, and/or a 45-degree view of the user are extracted from the video and used in the process that follows. Steps 2302 and 2304 may be performed in any order in various embodiments of the present invention, or the two steps may be implemented in parallel.

In one embodiment, the system may automatically calculate (e.g., using one or more AI-algorithms) body measurements using the photos and the normalization data, as further described below in connection with the following steps. In one embodiment, the user may also indicate whether the user is dressed in tight, normal, or loose clothing for more accurate results.

In one embodiment, the images may be taken at a specified distance (e.g., approximately 10 feet away from the camera of a user's device). In one embodiment, the images may be taken with the user having a specific pose (e.g., arms in a predetermined position, legs spread at a shoulder length, back straight, "A-pose," etc.). In another embodiment, multiple images of a given position (e.g., front and side view photos) may be taken and an average image may be determined for each position. This may be performed to increase accuracy. In another embodiment, the user may be positioned against a background of a specific type (e.g., a neutral color, or having a predetermined background image). In some embodiments, the user may be positions against any type of background. In one embodiment, the front and side view photos may be taken under similar lighting conditions (e.g., a given brightness, shadow, and the like). In another embodiment, the front and side view photos may include images of the user wearing normally fitted clothing (e.g., not extra loose or extra tight). Alternatively, or additionally, the front and side view photos may include images of the user partially clothed (e.g., shirtless), or having a different type of fit (e.g., tight, loose, etc.) depending on the needs of the AI-based algorithms and associated processes.

At step 2306, a body feature, such as a body part of the human (e.g., a neck, an arm, a leg, etc.) may be extracted from the image using a first deep learning network (DLN) known as a segmentation DLN. In one embodiment, "deep learning" may refer to a class of machine learning algorithms that use a cascade of multiple layers of nonlinear processing units for feature extraction and transformation modeled after neural networks. In one embodiment, the successive layers may use the output from the previous layer as input. In one embodiment, the "deep" in "deep learning" may refer to the number of layers through which the data is transformed.

Before performing this segmentation step on data from a real user, the system may have been trained first, for example, on sample photos of humans posing in different environments in different clothing, or by utilizing the training data generation processes described herein. In some embodiments, any suitable deep learning architecture may be used, such as deep neural networks, deep belief networks, and/or recurrent neural networks. In another embodiment, the deep learning algorithms may learn in supervised (e.g., classification) and/or unsupervised (e.g., pattern analysis) manners. Further, the deep learning algorithms may learn multiple levels of representations that correspond to different levels of abstraction of the information encoded in the images (e.g., body, body part, etc.). In another embodiment, the images (e.g., the front and side photos) may be represented as a matrix of pixels. For example, in one embodiment, the first representational layer of the deep learning network may abstract the pixels and encode edges; the second layer may compose and encode arrangements of edges; the third layer may encode a nose and eyes; and the fourth layer may recognize that the image contains a face, and so on.

In one embodiment, the segmentation DLN algorithm may be trained with segmentation training data. In some embodiments, the segmentation training data may include thousands of sample humans with manually-segmented body features or generated by utilizing the training data generation processes described herein. In some embodiments, the training data includes medical data, for example from CAT scans, MRI scans, and so forth. In some embodiments, the training data includes data from previous tailor or 3D body measurements that include 3D body scans from 3D body scanners and "ground truth" data. In some embodiments, the 3D body scans may be used to extract approximate front and/or side view photos, in cases where the front and side view photos are not explicitly available. In some embodiments, the ground truth data comprises human tailor-measured data; while in other embodiments, the ground truth data comprises automatically extracted 1D body size measurements from the 3D body scans.

At step 2307, an annotation line for each body part that was extracted at step 2306 may be drawn using one or more additional deep learning networks (DLNs), for example an annotation DLN. In one embodiment, there is a separate body feature annotation DLN for each body part. In other embodiments, there is one body feature annotation DLN for the entire body.

In one embodiment, the system may generate and extract body feature measurements by using an AI-based algorithm such as an annotation DLN, for example, by first drawing annotation lines from signals obtained from the body features. Each annotation line may be different for each body feature and may be drawn differently. For example, for the bicep width or circumference, the system may draw a line perpendicular to the skeletal line at the bicep location; for the chest, the system may connect two chest dots instead. From the annotation of each body feature, a body feature measurement may then be obtained by normalizing on the user's height received in step 2302, as described further below.

Before performing this annotation step on data from a real user, the system may have been trained first, for example, on sample photos of humans posing in different environments in different clothing, or by utilizing the training data generation processes described herein. The segmentation and annotation DLNs are described in more detail below.

At step 2308, a body feature measurement may be estimated for each body part that had an annotation line drawn at step 2307 using one or more machine learning algorithms, for example a sizing machine learning (ML) algorithm. In one embodiment, the sizing ML algorithm comprises a random forest machine learning module. In one embodiment, there is a separate sizing ML module for each body part. In some embodiments, there is one sizing ML module for the entire body. In one embodiment, the system may determine the sizes of the body features using as input the height received in step 2302 to normalize the sizing estimates. In order to do this, the annotation DLN in one embodiment draws a "full body" annotation line indicating a location of the subject's height, with a dot representing a bottom of the subject's feet and another dot representing a top of the subject's head. This "fully body" annotation line is used to normalize other annotation lines by the subject's known height provided in step 2302. In other words, the height of the subject in the image is detected and used along with the known actual height to normalize all annotation line measurements. This process may be thought of as "height reference normalization," using the subject's known height as a standard measurement for normalization. Other normalization factors are possible and within the scope of the present invention, including but not limited to books of known height, standard size papers of known size, standard-issued credit cards of known size, and so forth.

In another embodiment, additional user demographic data, such as, but not limited to, weight, a BMI index, a gender, an age, and/or other demographic information associated with the user received in step 2302 is used as input to the sizing ML algorithm (such as random forest), described in greater detail below.

The system may also use other algorithms, means, and medians for each body feature measurement. The annotation DLN and sizing ML may be implemented as one sizing DLN, that annotates and performs measurements on each body feature, or may be implemented as two separate modules, an annotation DLN that annotates each body feature, and a separate sizing ML module that performs the measurements on the annotated body feature. Similarly, various alternative architectures for implementing the segmentation DLN of step 2306, the annotation DLN of step 2307, and the sizing ML module of step 2308 are possible. For example, FIG. 22 corresponds to one possible architecture, in which the segmentation DLN, annotation DLN, and sizing ML module are separate modules. In contrast, an alternative architecture comprises wherein the segmentation DLN and annotation DLN are combined into a single annotation DLN (that effectively performs both segmentation and annotation) followed by a sizing ML module. Finally, yet another alternative architecture in which the segmentation DLN, annotation DLN, and sizing ML module are all combined into a single sizing DLN that effectively performs all functions of segmentation, annotation, and size measurement.

At step 2310, a confidence level for each body feature measurement may be determined, obtained, or received from the sizing ML module from step 2308. In addition to outputting the predicted body measurements for each body feature, the sizing ML module also outputs a confidence level for each predicted body feature measurement, which is then utilized to determine if any other approaches should be utilized to improve on the output, as described below. In another embodiment, the confidence level may be based on a confidence interval. In particular, a confidence interval may refer to a type of interval estimate, computed from the statistics of the observed data (e.g., the front and side photos encoding image data), that might contain the true value of an unknown population parameter (e.g., a measurement of a body part). The interval may have an associated confidence level that may quantify the level of confidence that the parameter lies in the interval. More strictly speaking, the confidence level represents the frequency (i.e. the proportion) of possible confidence intervals that contain the true value of the unknown population parameter. In other words, if confidence intervals are constructed using a given confidence level from an infinite number of independent sample statistics, the proportion of those intervals that contain the true value of the parameter will be equal to the confidence level. In another embodiment, the confidence level may be designated prior to examining the data (e.g., the images and extracted measurements therefrom). In one embodiment, a 95% confidence level is used. However, other confidence levels can be used, for example, 90%, 99%, 99.5%, and so on.

In various embodiments, a confidence interval and corresponding confidence level may be determined based on a determination of a validity and/or an optimality. In another embodiment, validity may refer to the confidence level of the confidence interval holding, either exactly or to a good approximation. In one embodiment, the optimality may refer to a rule for constructing the confidence interval should make as much use of the information in the data-set (images and extracted features and measurements) as possible.

At step 2312, it may be determined whether the confidence level is greater than a predetermined value. If it is determined that the confidence level is greater than the predetermined value, then the process may proceed to step 2314, where the high-confidence body feature measurements may be outputted. If it is determined that the confidence level is less than the predetermined value, then the process may proceed to step 2316 or step 2318. The steps 2316 and 2318 are illustrative of one or more, optional, fallback algorithms for predicting or projecting estimated body feature measurements for those body features for which the deep-learning approach has a low confidence. Together with the high-confidence body feature measurements from the deep-learning approach (shown in dashed lines), and the projected body feature measurements from the alternative fallback algorithms for the low-confidence body feature measurements, are later synthesized into a complete set of high-confidence body feature measurements as described below. As noted, in another embodiment, the confidence level may be designated prior to examining the data (e.g., the images and extracted measurements therefrom).

In particular, at steps 2316 and 2318, other optional models (e.g., AI-based or computer vision-based models) may be applied. At step 2316, and according to one optional embodiment, a 3D human model matching algorithm may be applied. For example, the system may first utilize OpenCV and/or deep learning techniques to extract the human body from the background. The extracted human body is then matched to one or more known 3D human models in order to obtain body feature measurements. Using this technique and a database of existing 3D body scans, for example a database of several thousand 3D body scans, the system may match the closest body detected with the 3D body scans' points. Using the closest matching 3D model, the system may then extract body feature measurements from the 3D model.

Alternatively, and/or additionally, at step 2318, other models, such as a skeleton/joint position model may be applied. In one embodiment, skeleton/joint detection may be performed using OpenPose (discussed further below), an open source algorithm for pose detection. Using this technique to obtain the skeleton and joint positions, the system may then draw lines between the appropriate points, using an additional deep learning network (DLN) if necessary, that indicates positions of the middle of the bone that are drawn on top of the user photos to indicate various key skeletal structures, showing where various body parts, such as the shoulders, neck, and arms are. From this information, body feature measurements may be obtained from the appropriate lines. For example, a line connecting the shoulder and the wrist may be used to determine the arm length.

In one embodiment, the 3D model algorithm and the skeleton/joint position models are combined as follows (though this is not shown explicitly in FIG. 23). Using a database of existing 3D body scans, for example a database of several thousand 3D body scans, the system may match the closest skeleton detection with the 3D body scans' skeleton points, showing points and lines that indicate positions of the bone that indicate various key skeletal structures, showing where various body parts, such as the shoulders, neck, and arms are. Once the closest matching 3D model is matched, the system may extract body feature measurements from the 3D model.

In either or both cases, at step 2320, or at step 2322, or both, the high-confidence body feature measurements may be projected (e.g., estimated). In particular, the estimate of the high-confidence body feature measurement may be performed using a different process from the first, lower-confidence deep-learning process.

One advantageous feature of this approach is that the high-confidence body feature measurements from step 2314 (shown as a dashed line) may be used as inputs to assist with calibrating the other models, for example the 3D human model algorithm in step 2316 and the skeleton/joint position model in step 2318. That is, the high-confidence body feature measurements from the deep learning approach obtained in step 2308, may be used to assist the other models, for example 3D human model 2316 and/or skeleton/joint position model 2318. The other models (2316 and/or 2318) may then be used to obtain projected high-confidence body feature measurements for those body feature measurements that were determined to be have a confidence below a predetermined value in step 2312. Later, the projected high-confidence body feature measurements may replace or supplement the low-confidence body feature measurements from the deep-learning approach.

Further, at step 2324, the high confidence body feature measurements determined at step 2320 and/or step 2322 may be used to determine a high-confidence body feature measurement. In such a way, various models, that is, the 3D human model and the skeleton/joint position model, may both be used to further improve the accuracy of the body feature measurements obtained in step 2314. Therefore, the high-confidence body feature measurements are aggregated—the high-confidence body feature measurements from step 2314 (e.g., the deep-learning approach) are combined with the projected high-confidence body feature measurements from steps 2320 and 2322 (e.g., the other models).

At step 2326, the high-confidence body feature measurements are aggregated into complete body measurements of the entire human body and are then output for use. In particular, the body measurements may be output to a user device and/or a corresponding server, for example associated with a company that manufactures clothing based on the measurements. In one embodiment, the output may be in the form of a text message, an email, a textual description on a mobile application or website, combinations thereof, and the like. The complete body measurements may then be used for any purposes, including but not limited to custom garment generation. One of ordinary skill in the art would recognize that the output of the complete body measurements may be utilized for any purpose in which accurate and simple body measurements are useful, such as but not limited to fitness, health, shopping, and so forth.

Figure 24:
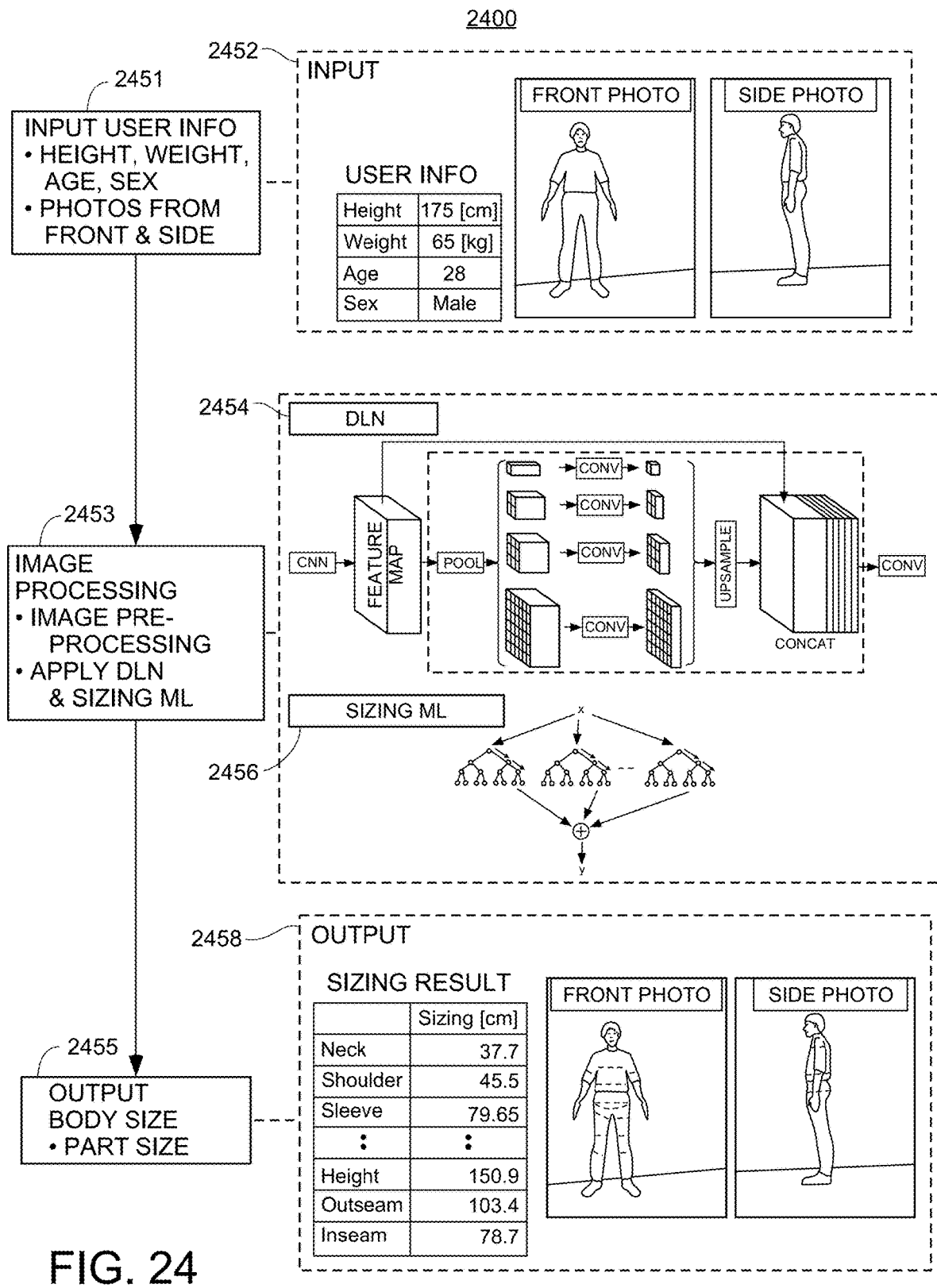
FIG. 24 shows another illustrative flow diagram for a deep learning network for body measurement determination, in accordance with one embodiment.

FIG. 24 shows another example flow diagram 2400 for body measurement determination using deep learning networks (DLNs) and machine learning, in accordance with another embodiment of the invention. In step 2451, input data 2452, which comprises a front photo, side photo, and user parameters (height, weight, age, sex, etc.) are received. In step 2453, one or more image processing steps are applied. First, optional image pre-processing (perspective correction, human cropping, resizing etc.) steps may be performed. Next, the deep-learning network (DLN) 2454 is applied to the images for segmenting and annotating the body features. Next, the sizing machine learning module (ML) 2456 is applied to the annotated body features for determining the body size measurements from the annotation lines and one or more of the user parameters. Finally, in step 2455, the body size measurements (for example, 16 standard body part sizes) are output, shown illustratively as output data 2458. The output 2458 may include the sizing result (a set of standard body size measurements, such as neck, shoulder, sleeve, height, outseam, inseam, etc.), and may also include the front and side photos annotated with the annotation lines.

As shown in FIG. 24, and according to one embodiment, the body part segmentation and annotation is performed using a deep learning network (DLN) 2454. In one embodiment, the body part segmentation and annotation are performed using a convolutional neural network (CNN) combined with a pyramid scene parsing network (PSPNet) for improved global and local context information. In a PSPNet, the process may utilize global & local context information from different sized regions that are aggregated through a pyramid pooling module. As shown in FIG. 24, the input image is first passed through a convolutional neural network (CNN) to obtain a feature map which classifies or segments each pixel into a given body part and/or annotation line. Next, global & local context information is extracted from the feature map utilizing a pyramid pooling module, which aggregates information from the image on different size scales. Finally, the data is passed through a final convolution layer to classify each pixel into body part segments and/or annotation lines.

In one embodiment, the PSPNet algorithm may be implementation as described in Hengshuang Zhao, et al., "Pyramid Scene Parsing Network," CVPR 2017, Dec. 4, 2016, available at arXiv:1612.01105. PSPNet is only one illustrative deep learning network algorithm that is within the scope of the present invention, and the present invention is not limited to the use of PSPNet. Other deep learning algorithms are also within the scope of the present invention. For example, in one embodiment of the present invention, a convolutional neural network (CNN) is utilized to extract the body segments (segmentation), and a separate CNN is used to annotate each body segment (annotation).

Various illustrative machine learning algorithms 2456 for body measurement determination can predict measurement values from one or more feature values obtained from the deep learning networks (DLNs). In one embodiment, the body part sizing is determined using a random forest algorithm 2456, one illustrative machine learning algorithm. Random forest algorithms use a multitude of decision tree predictors, such that each decision tree depends on the values of a random subset of the training data, which minimizes the chances of overfitting to the training data set. In one embodiment, the random forest algorithm is implementation as described in Leo Breiman, "Random Forests," Machine Learning, 45, 5-32, 2001, Kluwer Academic Publishers, Netherlands, available at doi.org/10.1023/A: 1010933404324. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention. The input to the machine learning algorithm is the features values (x), which comprise the circumferences of the body parts obtained from the deep-learning networks, the height, and the other user parameters, as shown in FIG. 24. The output of the machine learning algorithm are the predicted values for the sizing measurements (y).

Figure 25:
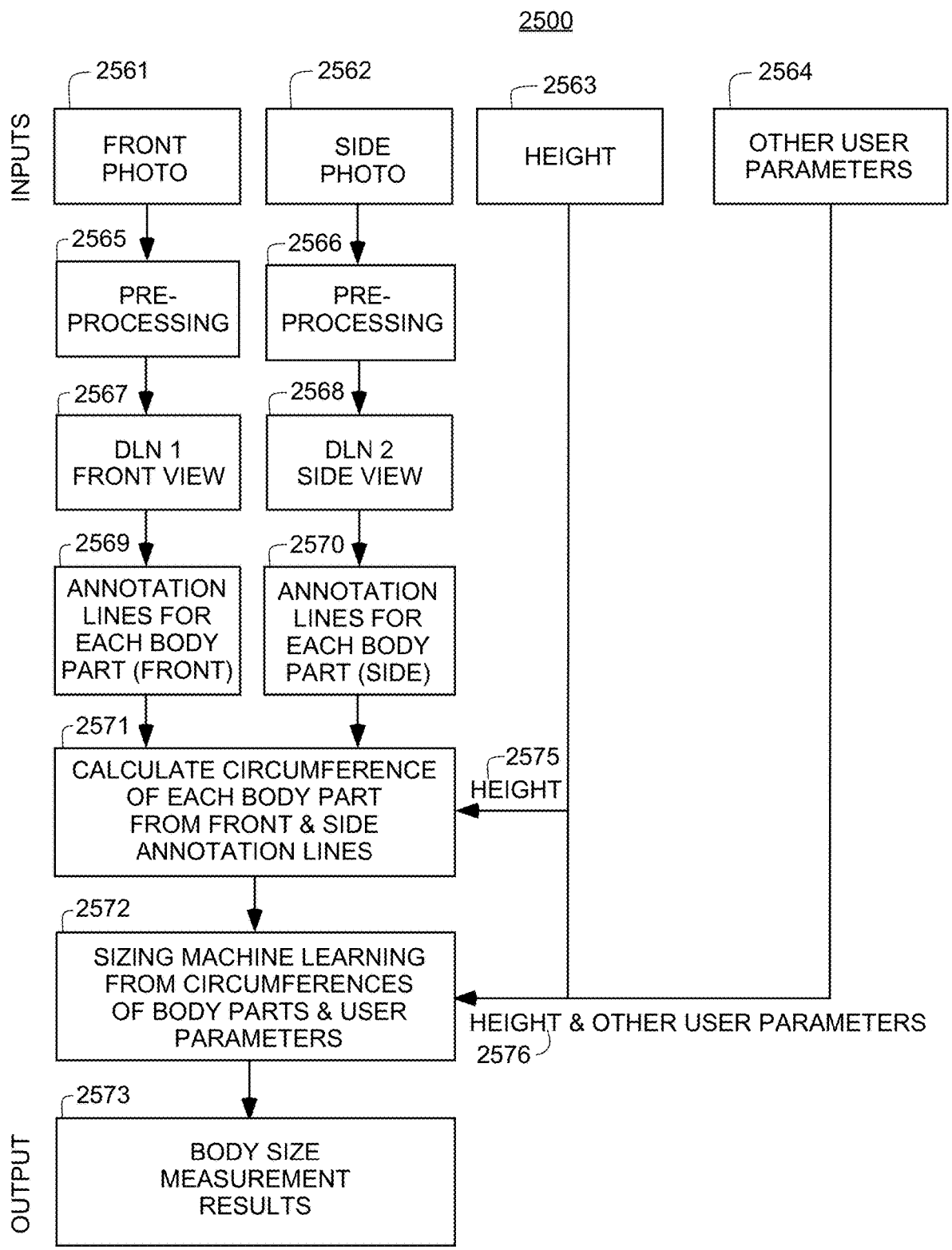
FIG. 25 shows yet another illustrative flow diagram for a deep learning network for body measurement determination, in accordance with one embodiment.

FIG. 25 shows another detailed flow diagram 2500 for body measurement determination using deep learning networks (DLNs) and machine learning, in accordance with another embodiment of the invention. Inputs to the body measurement process include front photo 2561, side photo 2562, height 2563, and other user parameters (weight, age, sex, etc.) 2564. The front photo 2561 is pre-processed in step 2565, while the side photo 2562 is pre-processed in step 2566. Examples of pre-processing steps, such as perspective correction, human cropping, image resizing, etc. were previously discussed. At step 2567, the pre-processed front photo is used as input to DLN 1 to extract annotation lines for the front photo 2561. At step 2568, the pre-processed side photo is used as input to DLN 2 to analogously extract annotation lines for the side photo 2561. The annotation lines for each body part from the front view 2569 are output from DLN 1 and the annotation lines for each body part from the side view 2570 are output from DLN 2. At step 2571, the two sets of annotation lines from the front photo 2561 and the side photo 2562 are utilized along with the height normalization reference 2575 received from height input 2563 to calculate a circumference of each body part. At step 2572, the circumference of each body part, along with the height and other user parameters 2576 received from inputs 2563 and 2564 are utilized in a machine learning algorithm, such as random forest, to calculate one or more body size measurements. At step 2573, the body size measurement results (length of each standard measurement) are output. Finally, the body measurement process ends at step 2574.

Hardware, Software, and Cloud Implementation of the Present Invention

As discussed, the data (e.g., photos, textual descriptions, and the like) described throughout the disclosure can include data that is stored on a database stored or hosted on a cloud computing platform. It is to be understood that although this disclosure includes a detailed description on cloud computing, below, implementation of the teachings recited herein are not limited to a cloud computing environment. Rather, embodiments of the present invention are capable of being implemented in conjunction with any other type of computing environment now known or later developed.

Cloud computing can refer to a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics may include one or more of the following. On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

In another embodiment, Service Models may include the one or more of the following. Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including networks, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models may include one or more of the following. Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The cloud computing environment may include one or more cloud computing nodes with which local computing devices used by cloud consumers, such as, for example, personal digital assistant (PDA) or cellular telephone, desktop computer, laptop computer, and/or automobile computer system can communicate. Nodes can communicate with one another. They can be group physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices are intended to be exemplary only and that computing nodes and cloud computing environment can communicate with any type of computerized device over any type of network and/or network addressable connection (e.g., using a web browser).

Figure 26:
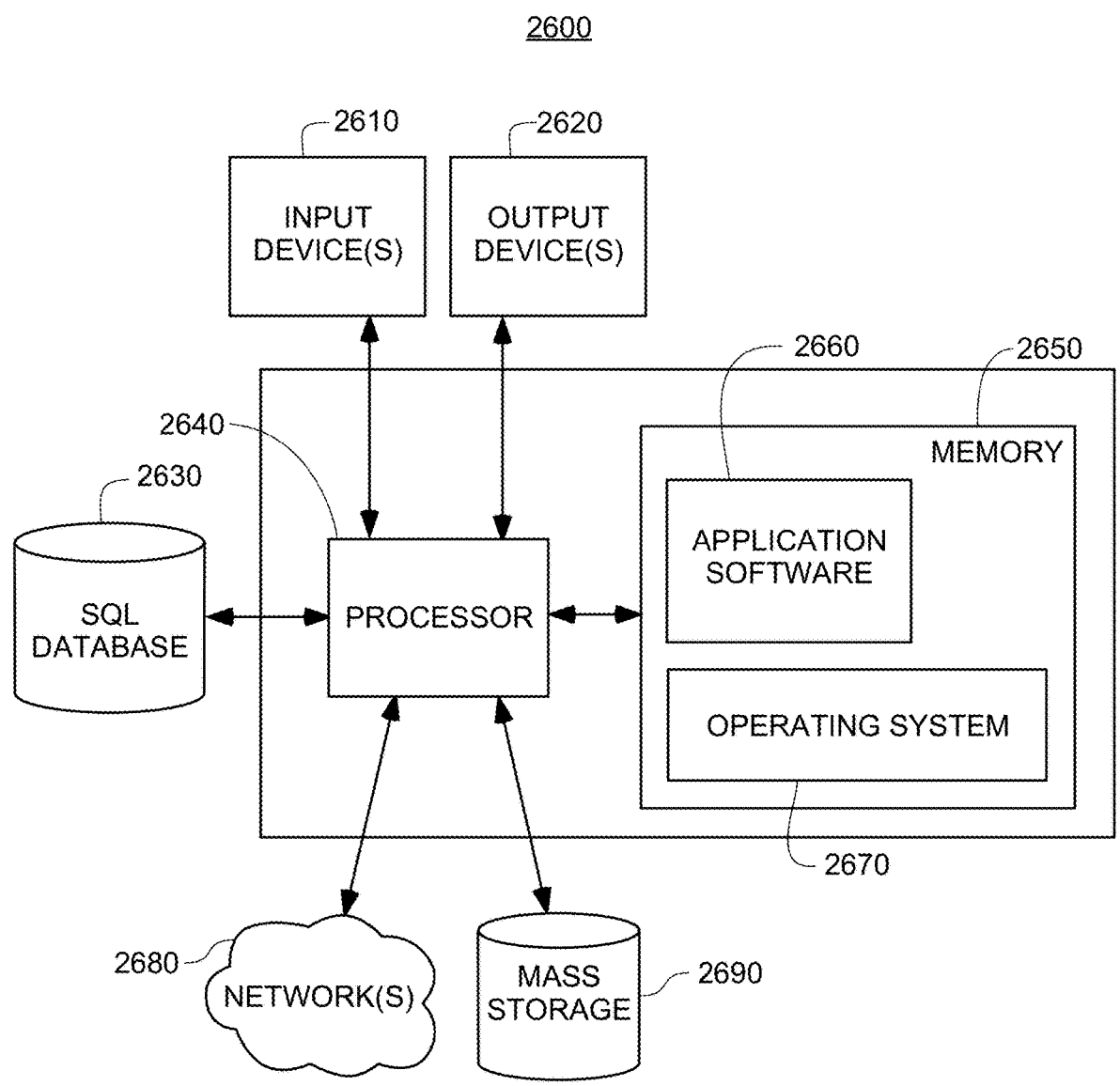
FIG. 26 shows an illustrative hardware architecture diagram of a computing device for implementing one embodiment of the present invention.

The present invention may be implemented using server-based hardware and software. FIG. 26 shows an illustrative hardware architecture diagram 2600 of a server for implementing one embodiment of the present invention. Many components of the system, for example, network interfaces etc., have not been shown, so as not to obscure the present invention. However, one of ordinary skill in the art would appreciate that the system necessarily includes these components. A user-device is a hardware that includes at least one processor 2640 coupled to a memory 2650. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs 2610 and outputs 2620 for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices 2690, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface one or more external SQL databases 2630, as well as one or more networks 2680 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

The hardware operates under the control of an operating system 2670, and executes various computer software applications 2660, components, programs, codes, libraries, objects, modules, etc. indicated collectively by reference numerals to perform the methods, processes, and techniques described above.

Figure 27:
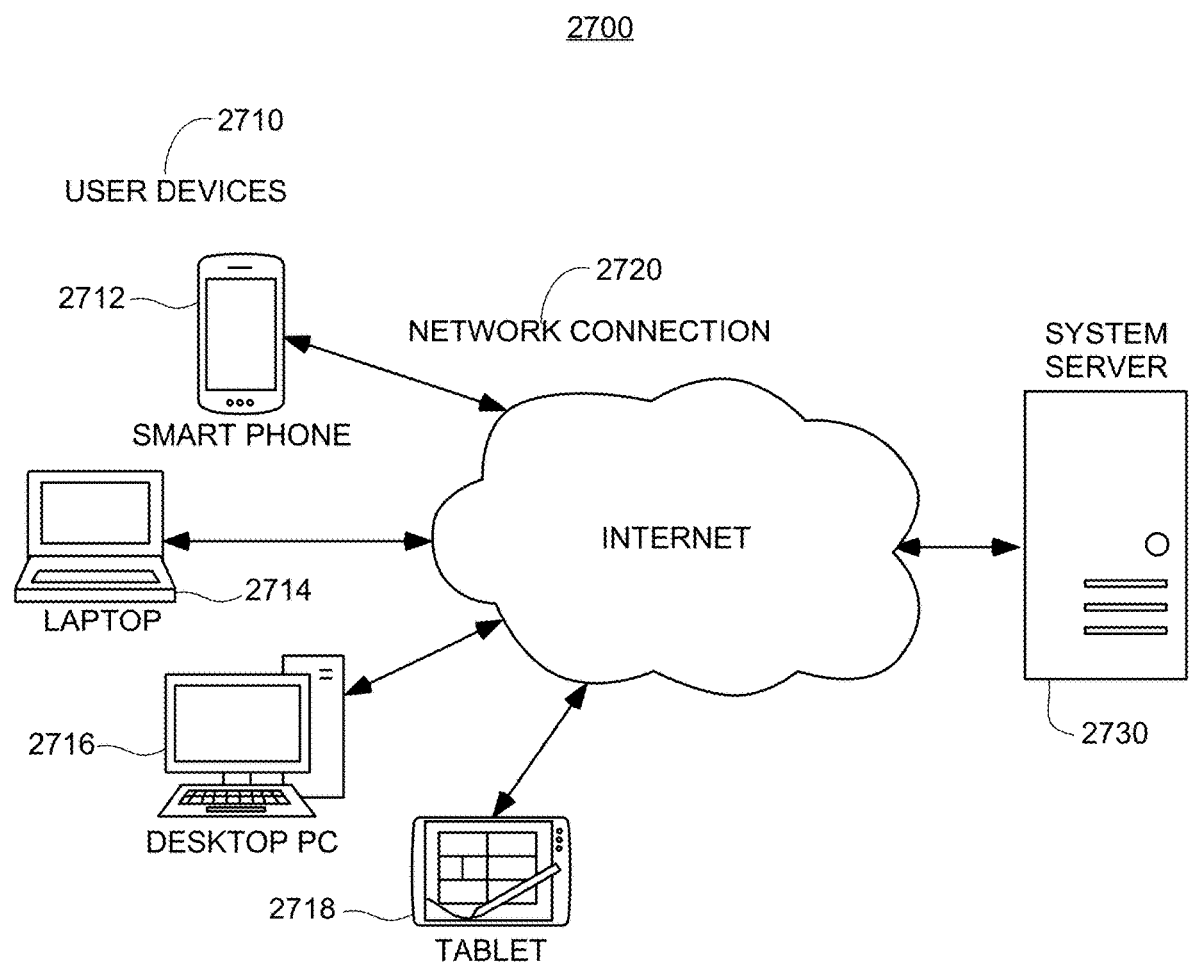
FIG. 27 shows an illustrative system architecture diagram for implementing one embodiment of the present invention in a client server environment.

The present invention may be implemented in a client server environment. FIG. 27 shows an illustrative system architecture 2700 for implementing one embodiment of the present invention in a client server environment. User devices 2710 on the client side may include smart phones 2712, laptops 2714, desktop PCs 2716, tablets 2718, or other devices. Such user devices 2710 access the service of the system server 2730 through some network connection 2720, such as the Internet.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

Example Use Cases of the Present Invention

Figure 28:
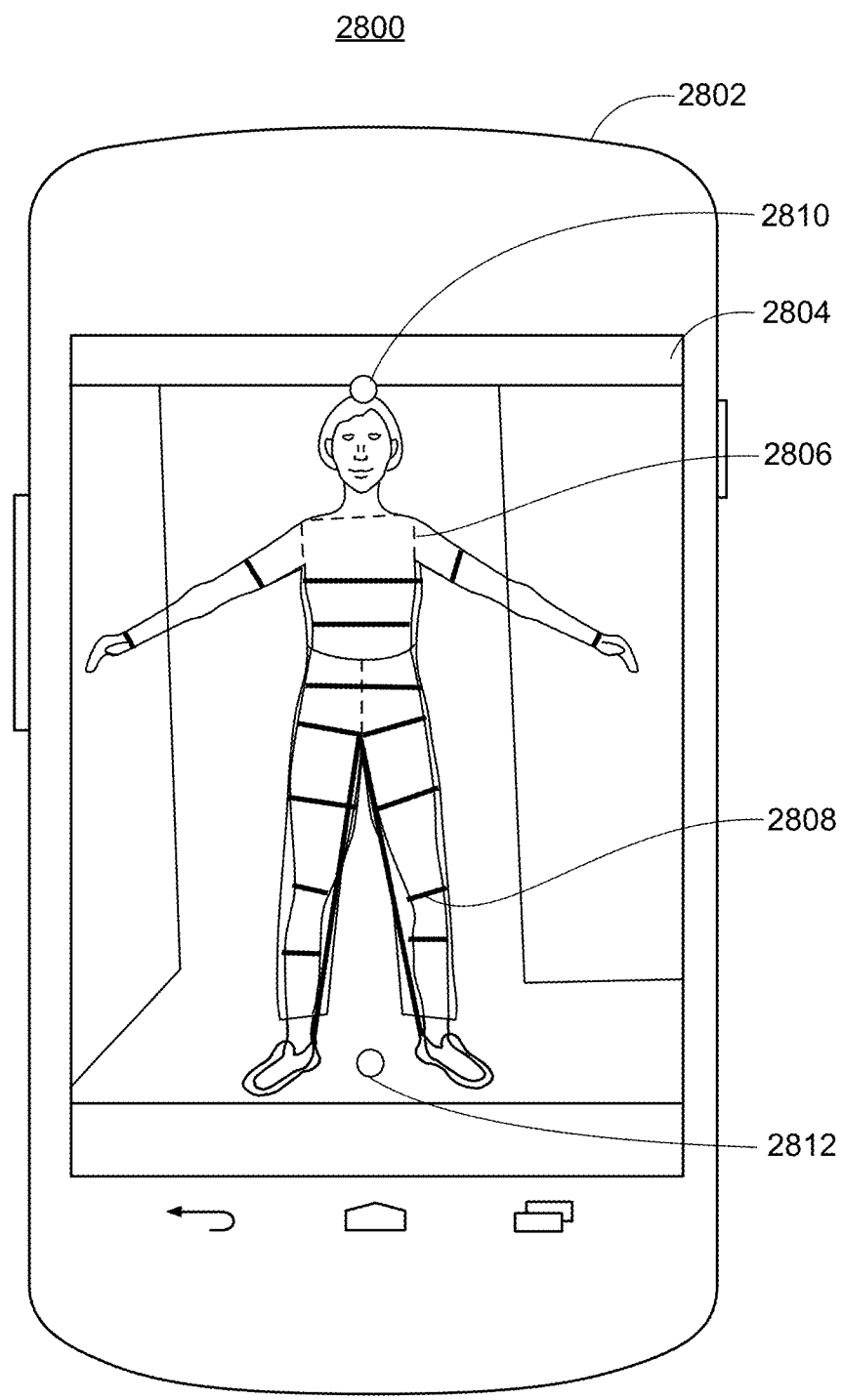
FIG. 28 shows an illustrative diagram of a use case of the present invention in which a single camera on a mobile device is used to capture human body measurements, showing a front view of a human in typical clothing standing against a standard background.

FIG. 28 is an illustrative diagram 2800 of a use case of the present invention in which a single camera on a mobile device 2802 is used to capture human body measurements, showing a front view of a human in typical clothing standing against a normal background. In illustrative diagram 2800, the mobile device 2802 has a display 2804, which displays a human figure. In one embodiment, the human figure torso is identified by, for example, dotted lines 2806, body segments are identified by, for example, solid lines 2808. The top of the head is identified by, for example, a first circular dot 2810, and the bottom of the feet are identified by, for example, a second circular dot 2812. The mobile device shown in FIG. 28 comprises at least one camera, a processor, a non-transitory storage medium, and a communication link to a server. In one embodiment, the one or more photos of the user's body are transmitted to a server that performs the operations described herein. In one embodiment, the one or more photos of the user's body are analyzed locally by the processor of the mobile device 2802. The operations performed return one or more body measurements, which may be stored on the server, as well as presented to the user. In addition, the body measurements may then be utilized for many purposes, including but not limited to, offering for sale to the user one or more custom garments, custom glasses, custom gloves, custom body suites, custom PPE (personal protection equipment), custom hats, custom diet regiments, custom exercise, gym, and workout routines, and so on. Without loss of generality, the body measurements may be output, transmitted, and/or utilized for any purpose for which body measurements are useful.

The present invention has been successfully implemented resulting in sub 1 cm accuracy body measurements relative to a human tailor. The system is able to use just two photos and achieve accuracy comparable to a human tailor. The system does not require the use of any specialized hardware sensors, does not require the user to stand against any special background, does not require special lighting, can be used with photos taken at any distance, and with the user wearing any type of clothing. The result is a body measurement system that works with any mobile device so that anyone can easily take photos of themselves and benefit from automatic full body measurement extraction.

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every user is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A computer-implemented method for identifying key point annotations on two-dimensional (2D) photographs of subjects for generating training data for training deep learning networks, the computer-implemented method executable by a hardware processor, the method comprising:
    receiving a 2D photograph of a subject in a first pose with at least one body part occluded, the 2D photograph captured using a 2D camera;
    receiving a three-dimensional (3D) scan model of the same subject in a second pose with the at least one body part visible, the 3D scan model captured using a 3D scanner, wherein the first pose is not identical to the second pose;
    receiving two or more key point annotations on the 3D scan model, wherein the two or more key point annotations comprise skeletal or surface points of the at least one body part;
    aligning the 3D scan model and the 2D photograph of the subject by adjusting the second pose of the subject in the 3D scan model to match the first pose of the subject in the 2D photograph using the two or more key point annotations, wherein the pose comprises a relative orientation of the at least one body part of the subject;
    identifying two or more key point annotations from the 3D scan model;
    projecting the two or more key point annotations onto the 2D photograph to generate one or more key point projections, after the adjusting the second pose of the 3D scan model, wherein the projections onto the 2D photograph of the two or more key point annotations indicate corresponding skeletal or surface points of the at least one body part occluded in the 2D photograph; and
    generating training data for at least one key point annotation deep learning network (DLN) from the one or more key point projections.

2. The computer-implemented method of claim 1, wherein the 3D scan model is a 3D body scan model.

3. The computer-implemented method of claim 1, further comprising:
    repeating, with a plurality of subjects, the steps of receiving the 2D photograph, the 3D scan model, and the key point annotations of the 3D scan model, and aligning the 3D scan model and the 2D photograph; and
    training the at least one key point annotation DLN for identifying key point annotations using the training data generated from the plurality of subjects to generate a trained key point annotation DLN.

4. The computer-implemented method of claim 3, further comprising:
    identifying key point annotations of a given subject by the trained key point annotation DLN from a given 2D photograph of the given subject.

5. The computer-implemented method of claim 4, wherein the identifying key point annotations of the given subject further comprises:
    accessing a given 2D photograph of the given subject by the trained key point annotation DLN; and
    outputting key point annotations of the given subject based on the given 2D photograph.

6. The computer-implemented method of claim 1,
    wherein the subject is a human subject, and
    wherein the 3D scan model is a 3D body scan model of the subject obtained from a 3D body scanner.

7. The computer-implemented method of claim 6, further comprising:
    extracting one or more spatial features from the 3D scan model; and generating training data to train a deep learning network (DLN) for spatial feature extraction by aggregating the one or more spatial features and the 2D photograph.

8. The computer-implemented method of claim 7, wherein the key point annotations identify one or more joints of the subject.

9. The computer-implemented method of claim 8, wherein the receiving the two or more point annotations on the 3D body scan model further comprises:
receiving one or more rigs, each rig connecting two or more key point annotations, the one or more rigs providing a skeletal structure indicating the one or more joints of the subject on the 3D body scan model.

10. The computer-implemented method of claim 9, wherein a given pose of a given subject is different from poses of the subjects used in the training of the at least one key point annotation DLN.

11. The computer-implemented method of claim 1, wherein the at least one key point annotation DLN comprises a plurality of key point annotation DLNs for a respective plurality of subject categories.

12. The computer-implemented method of claim 11, further comprising:
training each of the plurality of key point annotation DLNs for identifying key point annotations using a plurality of subjects belonging to the respective plurality of subject categories.

13. The computer-implemented method of claim 1, further comprising:
capturing a corresponding superimposed image of the aligned 3D scan model superimposed over the 2D photograph,
wherein the corresponding superimposed image is used in the generating of the training data step.

14. The computer-implemented method of claim 13, wherein the capturing of the corresponding superimposed image of the 3D scan model superimposed over the 2D photograph further comprises:
receiving a virtual arrangement comprising a virtual camera, the 3D scan model, and the 2D photograph; and
capturing, using the virtual camera, the corresponding superimposed image of the 3D scan model superimposed over the 2D photograph.

15. The computer-implemented method of claim 1, wherein the generating of the training data for the at least one key point annotation DLN further comprises:
receiving a plurality of augmentation data for the 2D photograph; and
augmenting the 2D photograph with the augmentation data to generate a plurality of augmented 2D photographs, each augmented 2D photograph containing an instance of the augmentation data.

16. A computer program product for identifying key point annotations on two-dimensional (2D) photographs of subjects for generating training data for training deep learning networks, the computer program product comprising a non-transitory computer readable storage medium having program instructions embodied therein, the program instructions executable by a processor to cause the processor to:
receive a 2D photograph of a subject in a first pose with at least one body part occluded, the 2D photograph captured using a 2D camera;
receive a three-dimensional (3D) scan model of the same subject in a second pose with the at least one body part visible, the 3D scan model captured using a 3D scanner, wherein the first pose is not identical to the second pose;
receive two or more key point annotations on the 3D scan model, wherein the two or more key point annotations comprise skeletal or surface points of the at least one body part;
align the 3D scan model and the 2D photograph of the subject by adjusting the second pose of the subject in the 3D scan model to match the first pose of the subject in the 2D photograph using the two or more key point annotations, wherein the pose comprises a relative orientation of the at least one body part of the subject;
identify two or more key point annotations from the 3D scan model;
project the two or more key point annotations onto the 2D photograph to generate one or more key point projections, after the adjusting the second pose of the 3D scan model, wherein the projections onto the 2D photograph of the two or more key point annotations indicate corresponding skeletal or surface points of the at least one body part occluded in the 2D photograph; and
generate training data for at least one key point annotation deep learning network (DLN) from the one or more key point projections.

17. The computer program product of claim 16, wherein the 3D scan model is a 3D body scan model.

18. The computer program product of claim 16, further comprising program code to:
train the at least one key point annotation DLN for identifying key point annotations using the training data to generate a trained key point annotation DLN.

19. The computer program product of claim 16, further comprising program code to:
receive a virtual arrangement comprising a virtual camera, the 3D scan model, and the 2D photograph; and
capture, using the virtual camera, a corresponding superimposed image of the 3D scan model superimposed over the 2D photograph.

20. A server for identifying key point annotations on two-dimensional (2D) photographs of subjects for generating training data for training deep learning networks, the server comprising a non-transitory storage medium and a hardware processor, the non-transitory storage medium storing computer-executable program code, which when executed by the hardware processor, causes the hardware processor to execute steps to:
receive a 2D photograph of a subject in a first pose with at least one body part occluded, the 2D photograph captured using a 2D camera;
receive a three-dimensional (3D) scan model of the same subject in a second pose with the at least one body part visible, the 3D scan model captured using a 3D scanner, wherein the first pose is not identical to the second pose;
receive two or more key point annotations on the 3D scan model, wherein the two or more key point annotations comprise skeletal or surface points of the at least one body parts;
align the 3D scan model and the 2D photograph of the subject by adjusting the second pose of the subject in the 3D scan model to match the first pose of the subject in the 2D photograph using the two or more key point annotations, wherein the pose comprises a relative orientation of the at least one body part of the subject;
identify two or more key point annotations from the 3D scan model;
project the two or more key point annotations onto the 2D photograph to generate one or more key point projections, after the adjusting the second pose of the 3D scan model, wherein the projections onto the 2D photograph of the two or more key point annotations indicate corresponding skeletal or surface points of the at least one body part occluded in the 2D photograph; and generate training data for at least one key point annotation deep learning network (DLN) from the one or more key point projections.

\* \* \* \* \*